United States Patent
Wan et al.

(10) Patent No.: US 12,216,891 B2
(45) Date of Patent: Feb. 4, 2025

(54) TABLE DATA DISPLAY METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Shiqi Wan, Beijing (CN); Jiashi Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/511,339

(22) Filed: Nov. 16, 2023

(65) Prior Publication Data
US 2024/0086048 A1    Mar. 14, 2024

Related U.S. Application Data

(63) Continuation of application No. PCT/CN2022/127993, filed on Oct. 27, 2022.

(30) Foreign Application Priority Data

Oct. 27, 2021  (CN) .......................... 202111257787.6

(51) Int. Cl.
G06F 3/04842    (2022.01)
G06F 3/0482     (2013.01)
G06F 16/22      (2019.01)

(52) U.S. Cl.
CPC ........ *G06F 3/04842* (2013.01); *G06F 3/0482* (2013.01); *G06F 16/2282* (2019.01)

(58) Field of Classification Search
CPC . G06F 3/04842; G06F 16/2282; G06F 3/0482
See application file for complete search history.

(56) References Cited

U.S. PATENT DOCUMENTS 8,290,806 B2 *  10/2012  Lee ................ G06Q 10/063118
                                                  705/7.17
11,094,417 B2 *  8/2021  Kano ........................ G06F 3/14
(Continued)

FOREIGN PATENT DOCUMENTS

CN    101533519 A    9/2009
CN    108984241 A    12/2018
(Continued)

OTHER PUBLICATIONS

"IT: Little People How to Make Pie Chart in Excel", available online at: <URL:https://baijiahao.baidu.com/s?id=1710759844258226329&wfr=spider&for=pc>, Sep. 15, 2021, with English translation (8 pages).
(Continued)

*Primary Examiner* — Anil K Bhargava
(74) *Attorney, Agent, or Firm* — Astute IP Law Group

(57) ABSTRACT

The present disclosure relates to a method, apparatus, an electronic device, and a storage medium of table data displaying. The method comprises: in response to a selection operation on at least part of table data on an original table page, highlighting selected table data on the original table page; and in response to a trigger operation on a target conversion component, displaying the selected table data in a target display mode on a target table page, wherein the target display mode is related to the target conversion component. In this way, the present disclosure can diversify the data display modes and meet different users' needs.

23 Claims, 25 Drawing Sheets

(56) References Cited

U.S. PATENT DOCUMENTS

| | | | |
|---|---|---|---|
| 11,429,558 B2* | 8/2022 | Nag | G06F 16/122 |
| 11,676,232 B2* | 6/2023 | Watkins, Jr. | G06F 16/904 |
| | | | 705/327 |
| 2004/0085316 A1 | 5/2004 | Malik | |
| 2011/0307773 A1 | 12/2011 | Grmusa et al. | |
| 2013/0290009 A1* | 10/2013 | Rosenblum | G16H 10/20 |
| | | | 705/2 |
| 2014/0115448 A1* | 4/2014 | Owen | G06F 40/103 |
| | | | 715/249 |
| 2015/0067568 A1* | 3/2015 | Lee | G06F 3/0488 |
| | | | 715/771 |
| 2016/0077694 A1* | 3/2016 | Christoph | G06F 16/9577 |
| | | | 715/227 |
| 2016/0110822 A1* | 4/2016 | Shaaban | G06Q 40/125 |
| | | | 705/32 |
| 2016/0132819 A1* | 5/2016 | Horner | G06F 3/0484 |
| | | | 705/7.15 |
| 2017/0153799 A1* | 6/2017 | Hoyer | G06Q 10/0631 |
| 2018/0088753 A1 | 3/2018 | Viégas et al. | |
| 2020/0372077 A1* | 11/2020 | Religa | G06F 40/18 |
| 2022/0164540 A1* | 5/2022 | Setlur | G06F 40/284 |
| 2024/0005091 A1* | 1/2024 | Viégas | G06F 40/216 |

FOREIGN PATENT DOCUMENTS

| | | |
|---|---|---|
| CN | 110941750 A | 3/2020 |
| CN | 111241796 A | 6/2020 |
| CN | 111274781 A | 6/2020 |
| CN | 112559576 A | 3/2021 |
| CN | 112860728 A | 5/2021 |
| CN | 112926288 A | 6/2021 |
| CN | 113377486 A | 9/2021 |
| CN | 113885770 A | 1/2022 |
| JP | 2010-218048 A | 9/2010 |
| WO | 2020/010775 A1 | 1/2020 |

OTHER PUBLICATIONS

International Search Report and Written Opinion, International Patent Application No. PCT/CN2022/127993, Jan. 17, 2023, with English translation of Search Report (11 pages).
Office Action issued in Chinese Patent Application No. 202111257787.6, Aug. 7, 2023 (16 pages).
Decision to Grant, issue in Chinese Patent Application No. 202111257787.6, Jan. 4, 2024 (5 pages).
Extended European Search Report for European Patent Application No. 22886079.7, mailed on Sep. 4, 2024, 6 pages.

* cited by examiner

| | Job | Depart-ment | Category | Number of recruitments | City | Recruitment type | Years of work | HR | Start time | End time |
|---|---|---|---|---|---|---|---|---|---|---|
| 1 | Job1 | Department1 | R&D | 3 | Beijing | Social recruitment | 1-3 years | HR1 | 8/1 | 8/30 |
| 2 | Job2 | Department1 | Product | 1 | Shenzhen | Social recruitment | 5-8 years | HR3 | 10/1 | 10/30 |
| 3 | Job3 | Department2 | Operation | 3 | Shenzhen | Campus recruitment | Less than 1 year | HR3 | 7/1 | 9/30 |
| 4 | Job4 | Department3 | Operation | 1 | Beijing | Social recruitment | 3-5 years | HR2 | 7/25 | 8/25 |
| 5 | Job5 | Department4 | R&D | 5 | Hangzhou | Internship | None | HR3 | 7/1 | 9/30 |
| 6 | Job6 | Department2 | R&D | 2 | Shenzhen | Campus recruitment | 1-3 years | HR1 | 10/1 | 10/30 |
| 7 | | | | | | | | | | |
| 8 | | | | | | | | | | |

Fig. 1B

Original table page | Target table page

>> Board view

Department1
Job1
Department1
R&D
3.0
Beijing
Social recruitment
1-3 years

Department2
Job3
Department2
Operation
3.0
Shenzhen
Campus recruitment
Less than 1 year Department3
Job4
Department3
Operation
1.0
Beijing
Social recruitment
3-5 years Department
Job5
Department4
R&D
5.0
Hangzhou
Internship
None Job2
Department1
Product
1.0
Shenzhen
Social recruitment
5-8 years Job6
Department2
R&D
2.0
Shenzhen
Campus recruitment
1-3 years

| Original table page | Target table page |

>>Album view

| Job1 Department1 R&D | Job2 Department1 Product | Job3 Department2 Operation | Job4 Department3 Operation | Job5 Department4 R&D |

| Job6 Department2 R&D |

| Original table page | Target table page |

>> Gantt chart view

| | Job | Depart-ment | Categ-ory | Number of recruitments | city | Recruitment type | Years of work | 2021.9 | | | | | | | |
|---|---|---|---|---|---|---|---|---|---|---|---|---|---|---|---|
| | | | | | | | | 1 | 2 | 3 | 4 | 5 | 6 | 7 | 8 |
| 1 | Job1 | Depart-ment1 | R&D | 3 | Bei jing | Social recruitment | 1-3 years | | | | | | | | |
| 2 | Job2 | Depart-ment1 | Prod-uct | 1 | Shen zhen | Social recruitment | 5-8 years | | | | | | | | |
| 3 | Job3 | Depart-ment2 | Opera-tion | 3 | Shen zhen | Campus recruitment | Less than 1 year | | | | | | | | |
| 4 | Job4 | Depart-ment3 | Opera-tion | 1 | Bei jing | Social recruitment | 3-5 years | | | | | | | | |
| 5 | Job5 | Depart-ment4 | R&D | 5 | Hang zhou | Internship | None | | | | | | | | |
| 6 | Job6 | Depart-ment2 | R&D | 2 | Shen zhen | Campus recruitment | 1-3 years | | | | | | | | |

| Original table page | Target table page |
|---|---|

≫ Board view

| Department1 | Department2 | Department3 | Department4 |
|---|---|---|---|
| Job1<br>Department1<br>R&D<br>3.0<br>Beijing<br>Social recruitment<br>1-3 years | Job3<br>Department2<br>Operation<br>3.0<br>Shenzhen<br>Campus recruitment<br>Less than 1 year | Job4<br>Department3<br>Operation<br>1.0<br>Beijing<br>Social recruitment<br>3-5 years | Job5<br>Department4<br>R&D<br>5.0<br>Hangzhou<br>Internship<br>None |
| Job2<br>Department1<br>Product<br>1.0<br>Shenzhen<br>Social recruitment<br>5-8 years | Job6<br>Department2<br>R&D<br>2.0<br>Shenzhen<br>Campus recruitment<br>1-3 years | | |

| Original table page | Target table page |

>> Board view

| Department1 | Department2 | Department3 | Department4 |
|---|---|---|---|
| Job1<br>Department1<br>R&D<br>3.0<br>Beijing<br>Social recruitment | Job3<br>Department2<br>Operation<br>3.0<br>Shenzhen<br>Campus recruitment | Job4<br>Department3<br>Operation<br>1.0<br>Beijing<br>Social recruitment | Job5<br>Department4<br>R&D<br>5.0<br>Hangzhou<br>Internship |
| Job2<br>Department1<br>Product<br>1.0<br>Shenzhen<br>Social recruitment | Job6<br>Department2<br>R&D<br>2.0<br>Shenzhen<br>Campus recruitment | | |

Fig. 8C

TABLE DATA DISPLAY METHOD AND APPARATUS, ELECTRONIC DEVICE, AND STORAGE MEDIUM

CROSS REFERENCE TO RELATED APPLICATIONS

This application is a Continuation application of International Patent Application No. PCT/CN2022/127993, filed Oct. 27, 2022, which claims the priority to the Chinese Application No. 202111257787.6 entitled "TABLE DATA DISPLAYING METHOD AND APPARATUS, ELECTRONIC DEVICE, AND STORAGE MEDIUM" filed on Oct. 27, 2021, the disclosures of which are incorporated herein by reference in their entities.

FIELD

The present disclosure generally relates to the field of computer devices, and more specifically, to a method, an apparatus, an electronic device, and a storage medium of table data displaying.

BACKGROUND

In relational databases, a database table, also referred to as table, is a collection of a series of two-dimensional arrays to represent and store relationships between data objects. A table is a fundamental structure for forming a table space, which is comprised of intervals. It consists of vertical columns and horizontal rows. For example, in a table named "authors" about author information, each column includes information of all authors in terms of a certain specific type, for example, "surname," and each row contains all information on a certain specific author, including: surname, name, address, and the like.

For a particular database table, a number of columns is typically set in advance, and each column can be identified by its column name; a number of rows is always dynamically changing, and each row can be identified by data in a certain column or certain columns.

Currently, database products available on the market mainly include online tables, Vika tables and the like, but there is no method for converting a certain area in a table into a Gantt chart, album, or board, causing a failing in meeting the users' needs.

SUMMARY

To solve, or at least partly solve, the above-mentioned technical problem, embodiments of the present disclosure provide a method, an apparatus, an electronic device, and a storage medium of table data displaying, to diversify the table data modes.

In a first aspect, the present disclosure provides a method of table data displaying, comprising:
  in response to a selection operation on at least part of table data on an original table page, highlighting selected table data on the original table page; and
  in response to a trigger operation on a target conversion component, displaying the selected table data in a target display mode on a target table page, wherein the target display mode is related to the target conversion component.
Alternatively, the target conversion component at least comprises a first target conversion component, a second target conversion component, and/or a third target conversion component;
  in response to the trigger operation on the target conversion component, displaying the selected table data in the target display mode on the target table page, comprises:
  in response to a trigger operation on the first target conversion component, displaying the selected table data in board views on the target table page; and/or
  in response to a trigger operation on the second target conversion component, displaying the selected table data in album views on the target table page; and/or
  in response to a trigger operation on the third target conversion component, displaying the selected table data in Gantt chart views on the target table page.
Alternatively, in response to the trigger operation on the first target conversion component, displaying the selected table data in the board views on the target table page, comprises:
  in response to the trigger operation on the first target conversion component, displaying the selected table data in the board views on the target table page according to a board display mode.
Alternatively, the board display mode comprises: classifying the table data according to identification information corresponding to a target column;
  displaying the selected table data in board views on the target table page according to a board display mode, comprises:
  based on identification information of different row data, in the selected table data, corresponding to the target column, displaying the selected table data in the board views after classifying the selected table data according to the identification information.
Alternatively, in response to the trigger operation on the second target conversion component, displaying the selected table data in the album views on the target table page, comprises:
  in response to the trigger operation on the second target conversion component, displaying the selected table data in the album views on the target table page according to an album display mode.
Alternatively, the album display mode comprises: displaying identification information corresponding to a preset number of target columns in the table data;
  displaying the selected table data in the album views on the target table page according to the album display mode, comprises:
  obtaining target table data corresponding to the preset number of target columns corresponding to different rows of the selected table data, and displaying, on the target table page, the selected target table data in album views corresponding to different rows.
Alternatively, in response to the trigger operation on the third target conversion component, displaying the selected table data in the Gantt chart views on the target table page, comprises:
  in response to the trigger operation on the third target conversion component, displaying, on the target table page, the selected table data in the Gantt chart views according to a Gantt chart view display mode.
Alternatively, the Gantt chart view display mode comprises: displaying event information corresponding to different rows of table data according to a timeline;
  displaying, on the target table page, the selected table data in the Gantt chart views according to the Gantt chart view display mode, comprises:
  obtaining event information corresponding to different row of the selected table data, and displaying, on the target table page, event information corresponding to a row of the selected table data according to a timeline corresponding to different rows.

Alternatively, the method further comprises:
in response to a trigger operation on a target board view on the target table page, displaying the target board view in a form of cards; or
in response to a trigger operation on a target album view on the target table page, displaying the target album view in a form of cards; or
in response to a trigger operation on a target Gantt chart view on the target table page, displaying the target Gantt chart view in a form of cards.

Alternatively, the method further comprises:
in response to a trigger operation on a preset position of a card page, modifying and/or deleting a content of the preset position.

Alternatively, in response to the trigger operation on the preset position of the card page, modifying and/or deleting the content of the preset position, comprises:
in response to a trigger operation on a first type area at the preset position of the card page, modifying a content of the first type area.

Alternatively, in response to the trigger operation on the preset position of the card page, modifying and/or deleting the content of the preset position, comprises:
in response to a trigger operation on a second type area at the preset position of the card page, modifying and deleting a content of the second type area.

Alternatively, the method further comprises:
in response to a trigger operation on a configuration component, modifying a display mode on the target table page.

In a second aspect, the embodiments of the present disclosure provide a table data display apparatus, comprising:
a table data selection module configured for in response to a selection operation on at least part of table data on an original table page, highlighting selected table data on the original table page; and
a display module configured for in response to a trigger operation on a target conversion component, displaying the selected table data on a target table page according to a target display mode, wherein the target display mode is related to the target conversion component.

In a third aspect, the embodiments of the present disclosure provide an electronic device, comprising:
one or more processors; and
a storage device for storing one or more programs,
wherein the one or more programs, when executed by the one or more processors, cause the one or more processors to implement the method of the first aspect.

In a fourth aspect, the embodiments of the present disclosure provide a computer readable storage medium having computer programs stored thereon, wherein the programs, when executed by a processor, implement the method of the first aspect.

As compared with the prior art, the technical solution provided by embodiments of the present disclosure has the following advantages:
embodiments of the present disclosure provide a method, an apparatus, an electronic device, and a computer readable storage medium of table data displaying; the method includes: in response to a selection operation on at least part of table data on an original table page, highlighting selected table data on the original table page; and in response to a trigger operation on a target conversion component, displaying the selected table data in a target display mode on a target table page, where the target display mode is related to the target conversion component; in this way, the present disclosure can enable display of table data of a target area selected by a user on an original table page according to a target display mode; by displaying table data in a table in different modes, the present disclosure can diversify the display modes and meet different users' needs.

BRIEF DESCRIPTION OF THE DRAWINGS

Drawings which are incorporated into the Description and form a part thereof depict embodiments in line with the Description and are provided, together with the Description, to explain the principles of the present disclosure.

In order to make clear the technical solution according to embodiments of the present disclosure or the prior art technology, brief introduction will be provided below on the drawings necessary for the embodiments or the prior art technology. Based on the drawings, the ordinary skilled in the art could obtain other drawings apparently, without doing creative work.

FIG. 1 illustrates a schematic flowchart of a table data display method provided by embodiments of the present disclosure;

FIGS. 1A-1E illustrate a table data display interface provided by embodiments of the present disclosure, respectively;

FIG. 2 illustrates a schematic flowchart of another table data display method provided by an embodiment of the present disclosure;

FIGS. 2A-2D illustrate another table data display interface provided by an embodiment of the present disclosure, respectively;

FIG. 3 illustrates a schematic flowchart of a further table data display method provided by an embodiment of the present disclosure;

FIGS. 3A-3C illustrate a further table data display interface provided by an embodiment of the present disclosure, respectively;

FIGS. 6A-6C illustrate a still further table data display interface provided by an embodiment of the present disclosure, respectively;

FIGS. 8A-8C illustrate a still further table data display interface provided by an embodiment of the present disclosure, respectively;

DETAILED DESCRIPTION OF EMBODIMENTS

In order to make the objective, features, and advantages of the present disclosure more apparent, further description on the solution of the present disclosure will be provided below. It is worth noting that the features in an embodiment and embodiments of the present disclosure could be combined in the absence of conflict.

For a better understanding of the present disclosure, more details will be provided below; however, the present disclosure could also be implemented in other manners than the one described here. Obviously, the embodiments described here are only a part of embodiments of the present disclosure, rather than all of them.

Exemplarily, the present disclosure provides a method, an apparatus, an electronic device, and a storage medium of table data displaying. In a scenario of using a document table page, when a part of table data is selected on the document table page, in response to a trigger operation on a target conversion component, the selected table data are displayed on the target table page according to a target display mode, where the target display mode is related to the target conversion component, to thus display table data of a target area in the table according to the target display mode and improve user experience in using the table.

Wherein, the table data display method according to the present disclosure is executed by an electronic device, or an application program, a webpage, an official account, or the like, in an electronic device. The electronic device may be a tablet, mobile phone, wearable device, on-vehicle device, augmented reality (AR)/virtual reality (VR), laptop, ultra-mobile personal computer (UMPC), netbook, personal digital assistant (PDA), smart TV, smart screen, HD TV, 4K TV, smart speaker, smart projector, or the like. The present disclosure does not suggest any limitation to the specific type of the electronic device.

Wherein, the type of the operation system of the electronic device is not limited in the present disclosure, which may be, for example, Android system, Linux system, Windows system, iOS system, or the like.

Hereinafter, some specific embodiments will be provided to describe the technical solution of the present disclosure in detail.

Figures 1, 1A:
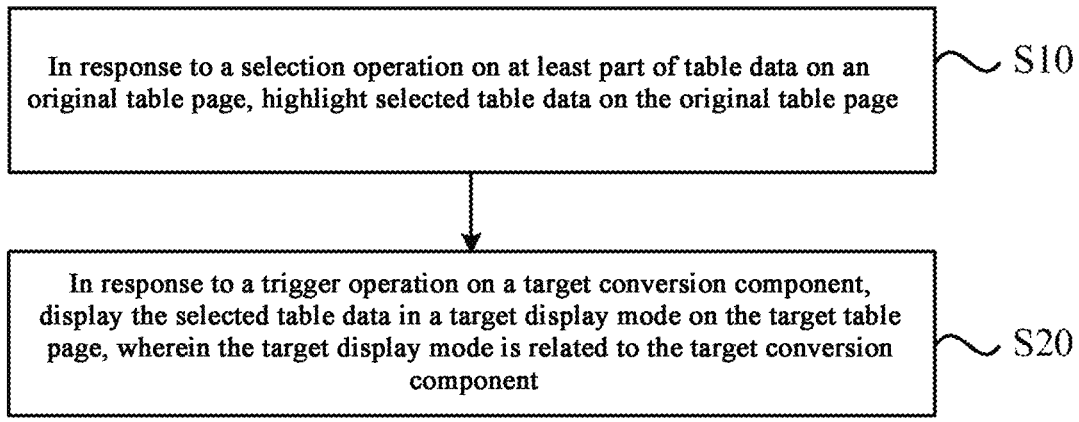

FIG. 1 illustrates a schematic flowchart of a table data display method provided by the present disclosure. As shown therein, the method according to the embodiments includes:

S10, in response to a selection operation of at least part of table data on an original table page, highlighting the selected table data on the original table page.

Specifically, the original table page 100 is a table page created or opened by a user, where the original table page includes table data imported by the user or table data created by the user. As shown in FIG. 1A, the selected data are 101, and after the user selects the at least part of table data 101 on the original table page 100, the selected data 101 are highlighted.

The user's selection operation may refer to that the user selects at least part of the table data on the original table page by clicking the left mouse button and moving the mouse.

Highlighting may refer to displaying the selected table data 101 in a prominent color, selecting the table data using a text box, or displaying the selected table data by changing a brightness. The specific manner of highlighting the selected table data is not limited in embodiments of the present disclosure.

S20, in response to a trigger operation on a target conversion component, displaying the selected table data on the target table page according to a target display mode.

Wherein, the target display mode is related to the target conversion component.

The target table page is a page newly created after the user triggers the target conversion component 103.

After the user selects the at least part of table data 101 on the original table page 100, the target conversion component 102 is triggered. At this time, the table data 101 selected by the user on the original table page 100 are displayed on the target table page 103 according to the target display mode.

Specifically, the target conversion component 102 at least includes a first target conversion component, a second target conversion component, and a third target conversion component. As shown in FIG. 1B, after the user triggers any one target conversion component in the target conversion component 102, the table data 101 selected by the user on the original table page are displayed on the target table page 103 according to the target display mode. Exemplarily, FIGS. 1C-1E respectively show a target display mode. By displaying the selected table data on the target table page according to the target display mode, the present disclosure can diversify the table display modes and meet different users' needs.

The table data display method provided by embodiments of the present disclosure includes: in response to a selection operation on at least part of table data on an original table page, highlighting selected table data on the original table page; and in response to a trigger operation on a target conversion component, displaying the selected table data in a target display mode on a target table page, where the target display mode is related to the target conversion component. In this way, the present disclosure can enable display of table data of a target area selected by a user on an original table page according to a target display mode. By displaying table data in a table in different modes, the present disclosure can diversify the display modes and meet different users' needs.

Figures 2, 2A:
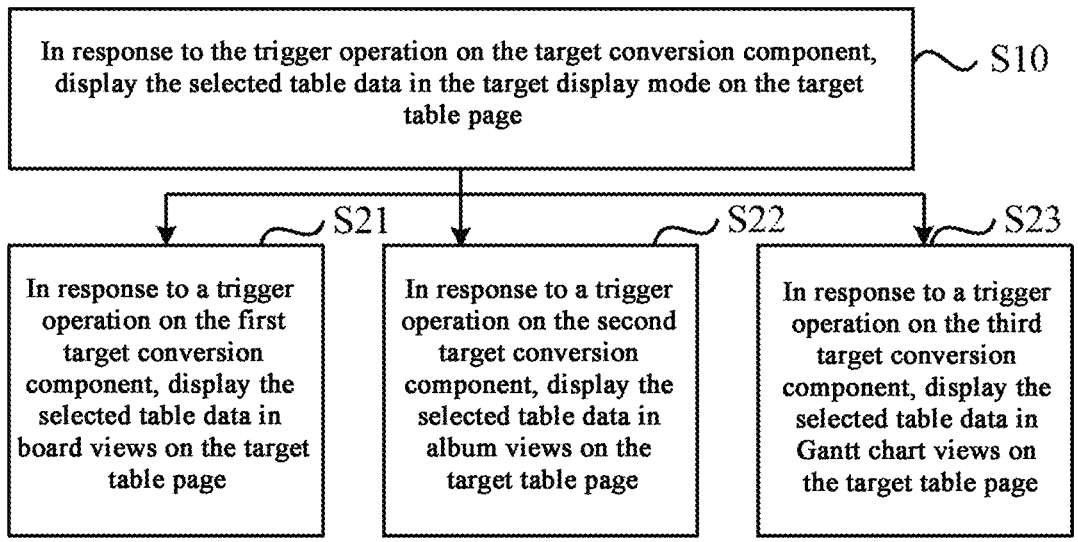

FIG. 2 illustrates another table data display method provided by an embodiment of the present disclosure. On the basis of the above-mentioned embodiments, this embodiment is an implementation of step S20 as shown in FIG. 2, including:

S21, in response to a trigger operation on the first target conversion component, displaying the selected table data in board views on the target table page.

As shown in FIGS. 1A and 1B, after the user selects the at least part of table data 101 on the original table page 100, the target conversion component 102 is triggered, and at this time, the table data 101 selected by the user on the original table page are displayed on a target table page 103 according to the target display mode. Specifically, the target conversion component 102 at least includes a first target conversion component 102A, a second target conversion component 102B, and a third target conversion component 102C. After the user triggers the first target conversion component 102A in the target conversion component 102, as shown in FIG. 2A, the selected table data 101 are displayed in board views on the target table page 103. For example, displaying the selected table data 101 in board views is shown in FIG. 1C.

In FIG. 1C, each board view corresponds to a certain row of table data in the table.

S22, in response to a trigger operation on the second target conversion component, displaying the selected table data in album views on the target table page.

Figures 2B, 2C:
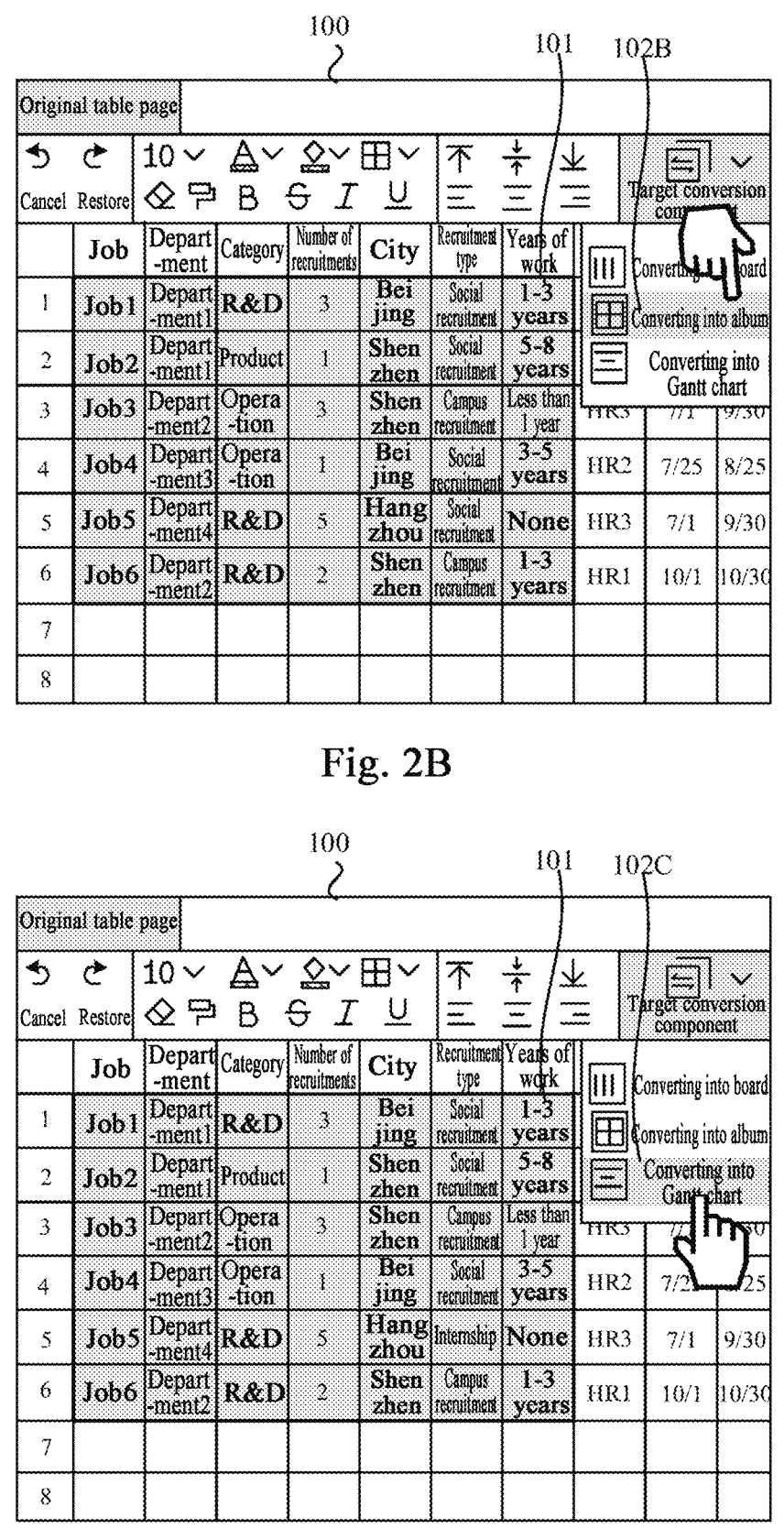

After the user triggers the second target conversion component 102B in the target conversion component 102, as shown in FIG. 2B, the selected table data are displayed in album views on the target table page. For example, displaying the selected table data in album views is shown in FIG. 1D.

In FIG. 1D, each album view corresponds to a certain row of table data in the table, and the selected table data on the original table page are displayed in album views according to an order of table data rows.

S23, in response to a trigger operation on the third target conversion component, displaying the table data in Gantt chart views on the target table page.

After the user triggers the third target conversion component 102C in the target conversion component, as shown in FIG. 2C, the selected table data are displayed in Gantt chart views on the target table page. For example, displaying the selected table data in the Gantt chart views is shown in FIG. 1E, and the selected table data on the original table page are displayed in the Gantt chart views according to an order of table data rows.

In the above embodiment, when the selected data are displayed in the board views on the target display page after the user triggers the first target conversion component, the target table page here refers to a table page corresponding to the board views; when the selected data are displayed in the album views on the target display page after the user triggers the second target conversion component, the target table page here refers to a table page corresponding to the album views; when the selected data are displayed in the Gantt chart views on the target display page after the user triggers the third target conversion component, the target table page here refers to a table page corresponding to the Gantt chart views.

Figures 2D, 3:
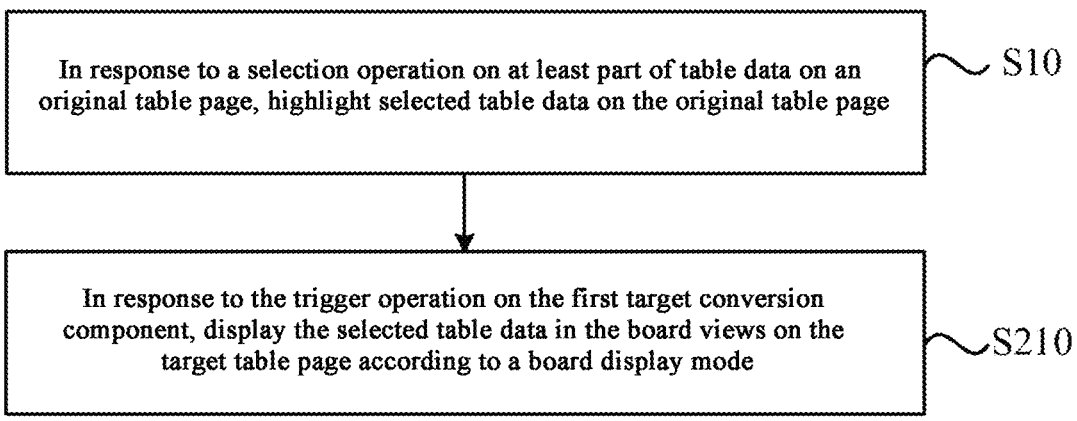

In other implementations, when the user triggers the first target conversion component 102A, the selected table data 101 are displayed in the board views; then, when the user triggers the second target conversion component 102B, the selected table data are displayed in the album views; in addition, when the user further triggers the third target conversion component 102C, the selected table data 101 are displayed in the Gantt chart views. At this time, the corresponding target table page includes: a table page corresponding to the board views, a table page corresponding to the album views, and a table page corresponding to the Gantt chart views, for example, as shown in FIG. 2D. In FIG. 2D, the target table page includes: a table page 103A corresponding to the board views, a table page 103B corresponding to the album views, and a table page 103C corresponding to the Gantt chart views, i.e., after the user triggers the first target conversion component 102A, the second target conversion component 102B, and the third target conversion component 102C on the same original table page, respectively, the selected data are displayed in the board views on the target table page 103, the selected table data are displayed in the album views on the target table page, and the selected table data are displayed in the Gantt chart views on the target table page, respectively.

FIG. 2D exemplarily shows that the user performs switching to the table page 103A corresponding to the board views. After the user performs switching to the table page 103B corresponding to the album views, the target table page here is displayed in the mode corresponding to FIG. 1D. After the user performs switching to the table page 103C corresponding to the Gantt chart views, the target table page here is displayed in the mode corresponding to FIG. 1E.

The table data display method provided by embodiments of the present disclosure includes: in response to the trigger operation on the first target conversion component in the target component, displaying the selected table data in the board views on the target table page; and/or, in response to the trigger operation on the second target conversion component, displaying the selected table data in the album views on the target table page; and/or, in response to the trigger operation on the third target conversion component, displaying the selected table data in the Gantt chart views on the target table page; when the user triggers any one of the target conversion components, the table data of the target area selected by the user on the original table page are displayed according to the target display mode corresponding to the target conversion component, to diversify the table data display modes.

Hereinafter, specific embodiments are provided to describe displaying the selected table data on the target table page in the board views, displaying the selected table data on the target table page in the album views, and displaying the selected table data on the target table page in the Gantt chart views, respectively.

FIG. 3 illustrates a schematic flowchart of a further table data display method provided by an embodiment of the present disclosure. On the basis of the above-mentioned embodiments, this embodiment is an implementation of step S21, as shown in FIG. 3, including:

S210, in response to the trigger operation on the first target conversion component, displaying the selected table data in the board views on the target table page according to a board display mode.

Specifically, the board display mode is related to user-defined settings. Since different columns in the table data correspond to different classification identifications on the original table page, when the board display mode set by the user includes displaying the selected table data in the board views on the target table page, display is performed according to whether the table data corresponding to the user-defined classification identifications are to be displayed or not.

For example, as shown in FIG. 1A, on the original table page, the table data 101 include the following classification identifications: job, department, category, number of recruits, city, and the like. If the table data 101 selected by the user on the original table page 100 are all row data under classification identifications including job, department, category, number of recruits, city, recruitment type, and years of work, the selected table data are displayed in the board views on the target table page according to the board display mode, as shown in FIG. 3A.

Alternatively, displaying the selected table data in the board views on the target table page according to the board display mode, includes:

based on identification information of different row data, in the selected table data, corresponding to the target column, displaying the selected table data in the board views after classifying the selected table data according to the identification information.

When there is a large data volume on the original table page, in order to enable the user to more intuitively obtain board views under a certain classification identification, the board display mode includes classifying the table data according to identification information corresponding to the target column, and then displaying the selected table data in the board views.

Specifically, continuing referring to FIG. 1A, on the original table page, the classification identifications of the table data 101 include: job, department, category, number of recruits, city, and the like. If the table data 101 selected by the user on the original table page 100 are all row data under classification identifications including job, department, category, number of recruits, city, recruitment type, and years of work, and if the user-defined board display mode includes displaying, in each board view, table data corresponding to the classification identifications including job, department, category, number of recruits, city, recruitment type, and years of work, and classifying the selected table data according to identification information which is department, the specific display mode is shown in FIG. 3A.

In FIG. 3A, each board displays table data with classification identifications including job, department, category and number of recruits in a row of the table on the original table page, and each board is classified according to department, i.e., row data with the same department in the selected table data on the original table page are displayed in the same column after converted into the board view display.

The table data display method provided by the embodiments of the present disclosure include: in response to the trigger operation on the first target conversion component, based on identification information of different row data, in the selected table data, corresponding to the target column, displaying the selected table data in the board views after classifying the selected table data according to the identification information, to thus implement display of the selected table data according to the board view display mode.

Corresponding to Step S210, the method further includes:
in response to a trigger operation on a target board view on the target table page, displaying the target board view in a form of cards.

When the user triggers a certain target board view on the target table page, the target board view is displayed in a form of cards where all identification information selected by the user on the original table page is displayed.

Figure 3B:
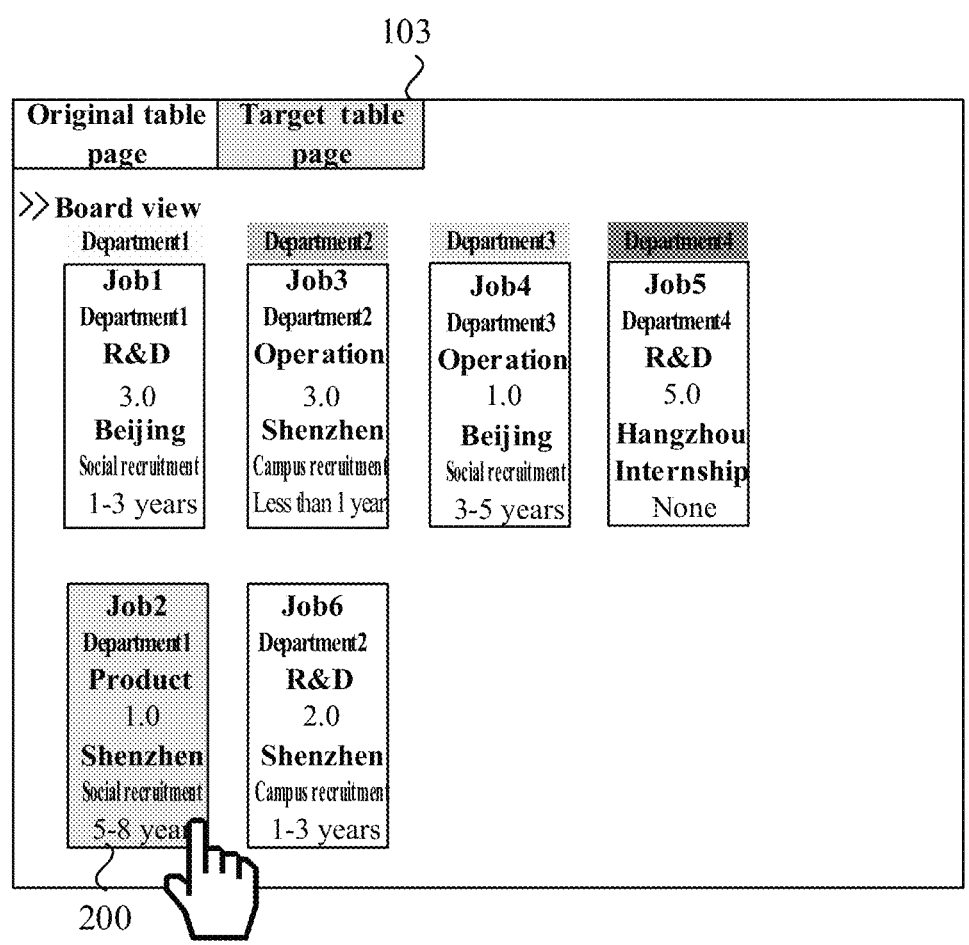
Figure 3C:
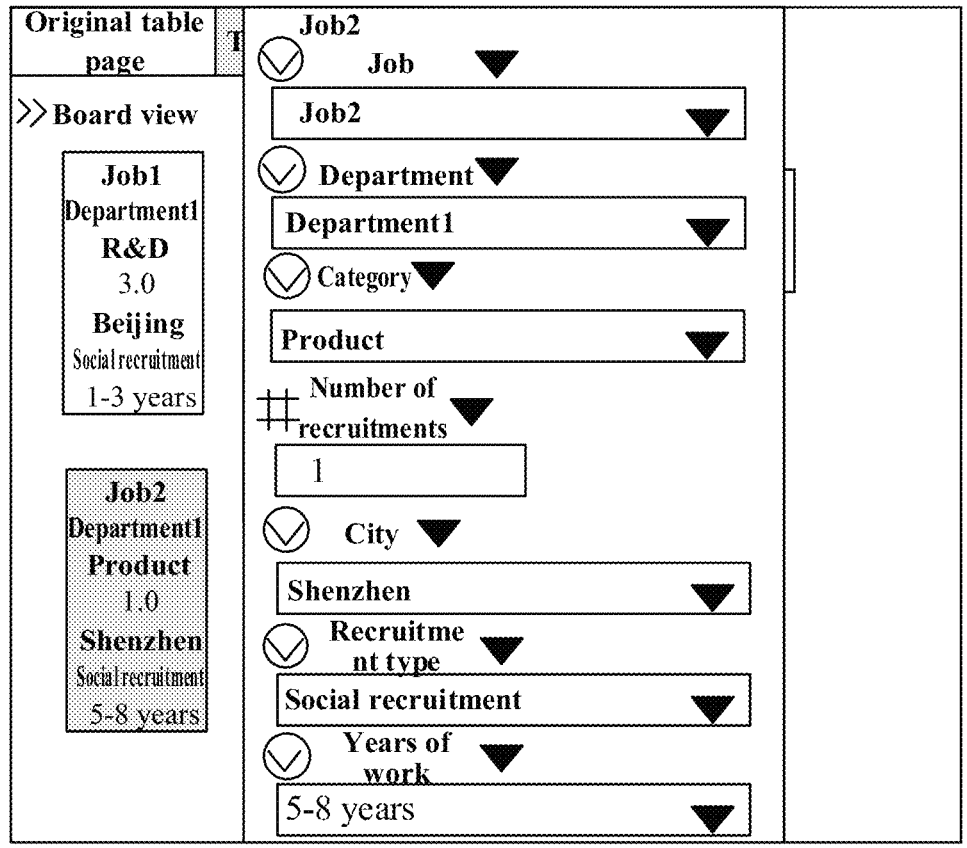

Specifically, if the table data selected by the user on the original table page include all row data under classification identifications including job, department, category, number of recruits, city, recruitment type, and years of work, and if the user-defined board display mode includes displaying, in each board, table data corresponding to classification identifications including job, department, category, number of recruits, city, recruitment type, and years of work, the selected table data are displayed on the target table page according to the board display mode as shown in FIG. 3B. When the user triggers the board 200 in FIG. 3B, all selected column data in a certain row of the table corresponding to the board 200 are displayed in the form of a card. As shown in FIG. 3C, the card displays data of the job, department, category, number of recruits, city, recruitment type, and years of work.

Figure 4:
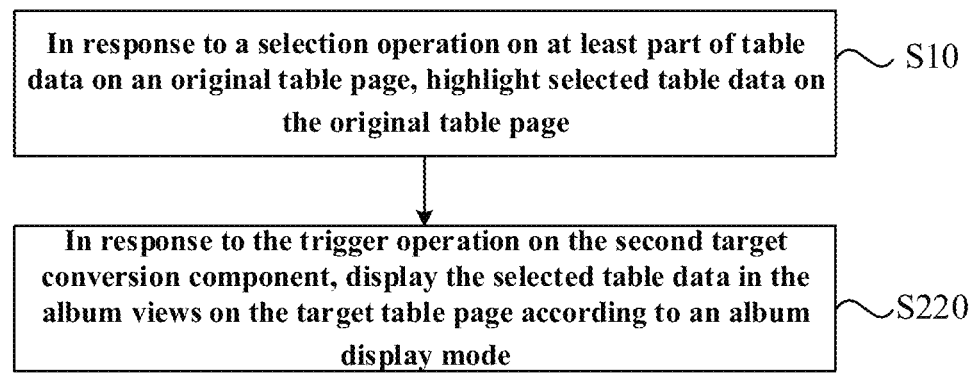
FIG. 4 illustrates a schematic flowchart of a still further table data display method provided by an embodiment of the present disclosure.

FIG. 4 illustrates a schematic flowchart of a still further table data display method provided by an embodiment of the present disclosure. On the basis of the above-mentioned embodiment, this embodiment of the present disclosure is an implementation of Step S22, including:

S220, in response to the trigger operation on the second target conversion component, displaying the selected table data in the album views on the target table page according to an album display mode.

Specifically, the album display mode is related to user-defined settings. Since different columns in the table data correspond to different classification identifications on the original table page, when the album display mode set by the user includes displaying the selected table data in the album views on the target table page, display is performed according to whether the table data corresponding to the user-defined classification identifications are to be displayed or not.

Figure 4A:
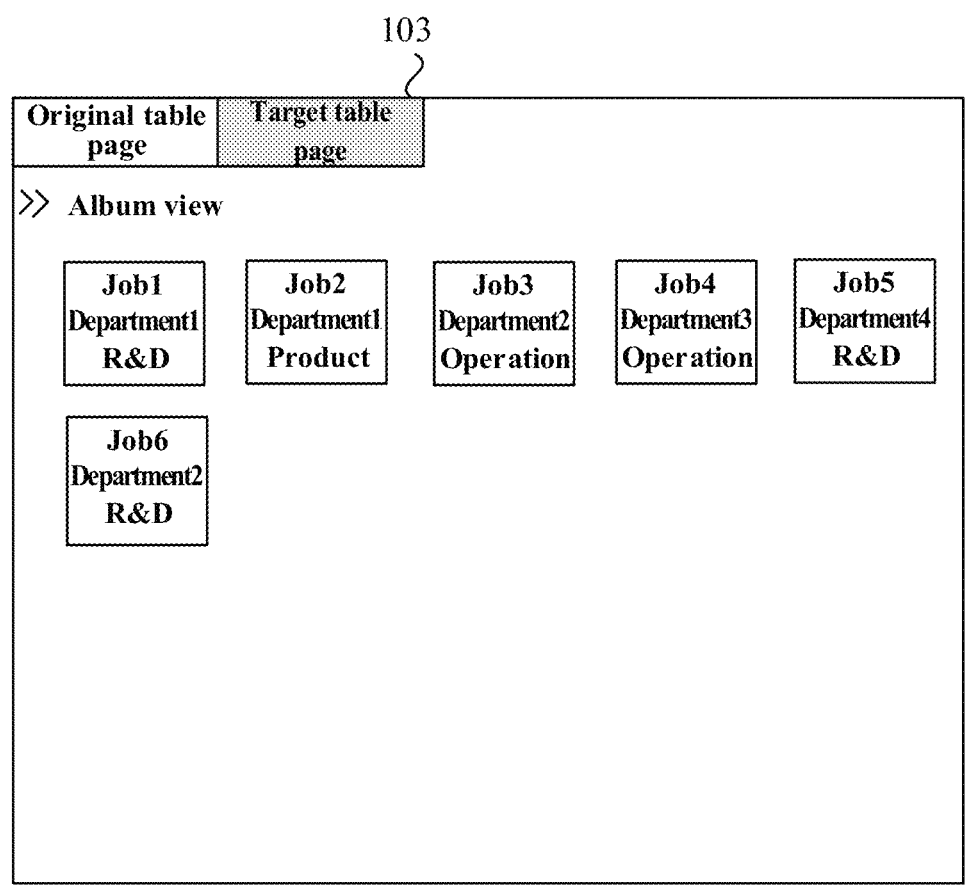
FIGS. 4A-4C illustrate a still further table data display interface provided by an embodiment of the present disclosure, respectively.

For example, as shown in FIG. 1A, on the original table page, the table data include the following classification identifications: job, department, category, number of recruits, city, and the like. If the table data selected by the user on the original table page are all row data under classification identifications including job, department, category, number of recruits, city, recruitment type, and years of work, and if the user-defined album display mode includes displaying, in each album, table data corresponding to the classification identifications including job, department, and category. At this time, displaying the selected table data on the target table page according to the album display mode is shown in FIG. 4A.

Alternatively, displaying the selected table data in the album views on the target table page according to the album display mode, includes:
obtaining target table data corresponding to a predetermined number of target columns corresponding to different rows of the selected table data, and displaying, on the target table page, the obtained target table data in the album views corresponding to different rows.

When there is a large data volume on the original table page, in order to enable the user to more intuitively obtain corresponding data under important classification identifications, the album display mode includes obtaining target table data corresponding to a predetermined number of target columns corresponding to different rows of the selected table data, and displaying, on the target table page, the obtained target table data in the album views corresponding to different rows.

Specifically, continuing with FIG. 1A, on the original table page, the classification identifications of the table data include: job, department, category, number of recruits, city, and the like. If the table data selected by the user on the original table page are all row data under classification identifications including job, department, category, number of recruits, city, recruitment type, and years of work, the user-defined album display mode includes displaying, in each album, table data corresponding to the classification identifications including job, department and category, and displaying, on the target table page, the obtained target table data in the album views corresponding to different rows, which is specifically shown in FIG. 4A.

In FIG. 4A, each album displays table data with classification identifications including job, department and category, and each album is displayed following an order of a respective row data in the original table.

The table data display method provided by the embodiment of the present disclosure include: in response to the trigger operation on the second target conversion component, obtaining the target table data corresponding to the predetermined number of target columns corresponding to different rows of the selected table data, and displaying, on the target table page, the selected target table data in the album views corresponding to different rows, to implement display of the selected table data according to the album view display mode.

Corresponding to Step S220, the method further includes:
in response to a trigger operation on a target album on the target table page, displaying the target album in a form of cards.

When the user triggers a certain target album on the target table page, the target album is displayed in a form of cards where all identification information selected by the user on the original table page is displayed.

Figure 4B:
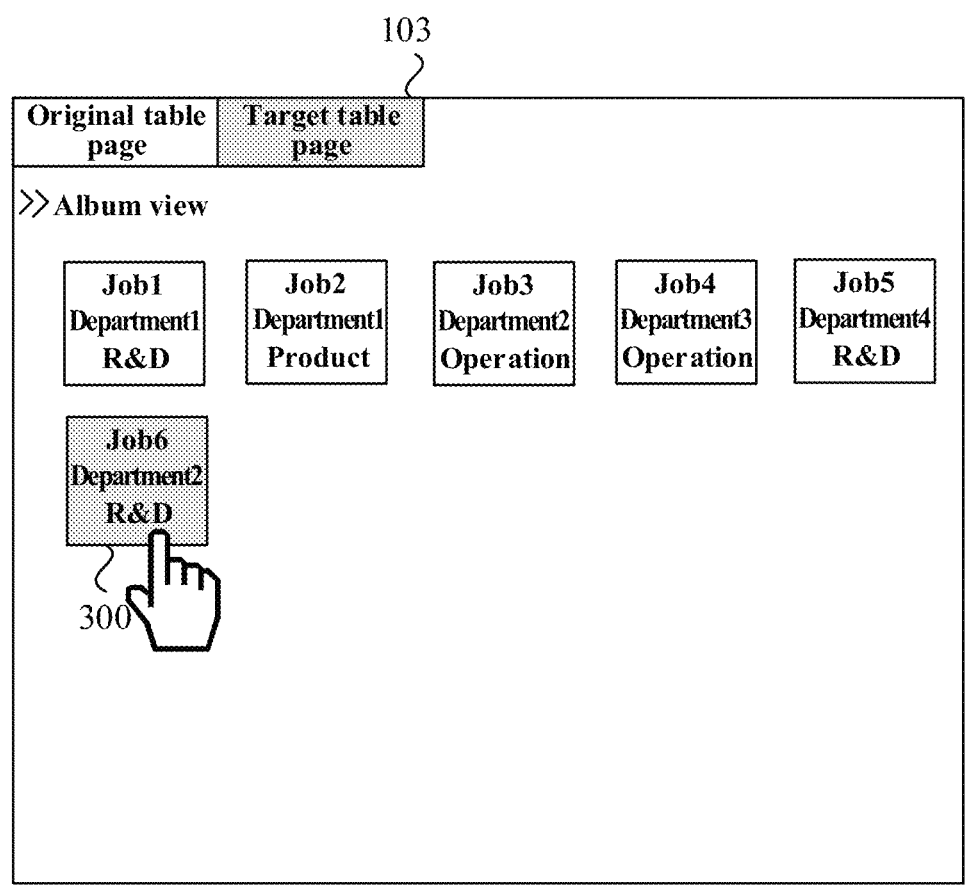
Figures 4C, 5:
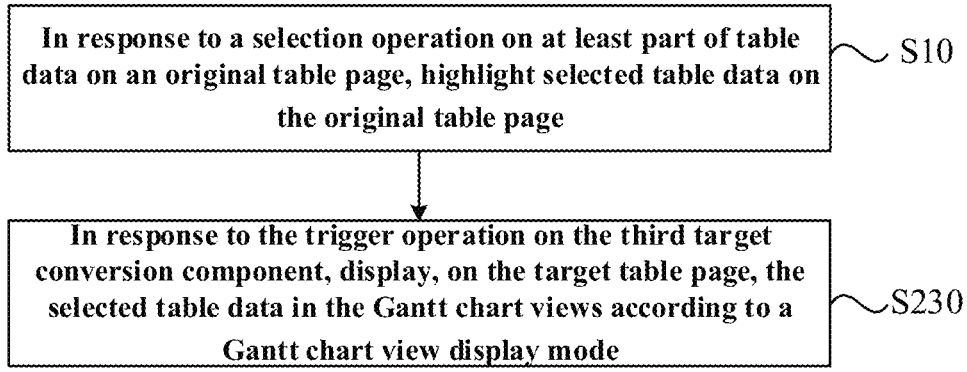
FIG. 5 illustrates a schematic flowchart of a still further table data display method provided by an embodiment of the present disclosure.

Specifically, if the table data selected by the user on the original table page include all row data under classification identifications including job, department, category, number of recruits, city, recruitment type, and years of work, and if the user-defined album display mode includes displaying, in each album, table data corresponding to classification identifications including job, department and category, the selected table data are displayed on the target table page according to the album view display mode as shown in FIG. 4B. When the user triggers the album 300 in FIG. 4B, all selected column data in a certain row corresponding to the album 300 are displayed in the form of cards. As shown in FIG. 4C, the cards display data of the job, department, category, number of recruits, city, recruitment type, and years of work.

FIG. 5 illustrates a schematic flowchart of a still further table data display method provided by an embodiment of the present disclosure. On the above-mentioned embodiment, this embodiment of the present disclosure is an implementation of Step S23, as shown in FIG. 5, including:

S230, in response to the trigger operation on the third target conversion component, displaying the selected table data in Gantt chart views on the target table page according to a Gantt chart display mode.

Specifically, the Gantt chart view display mode is related to user-defined settings. Since different columns in the table data correspond to different classification identifications on the original table page, when the Gantt chart view display mode set by the user includes displaying the selected table data in the Gantt chart views on the target table page, display is performed according to whether the table data corresponding to the user-defined classification identifications are to be displayed or not, and event information in a corresponding timeline is displayed.

Figure 5A:
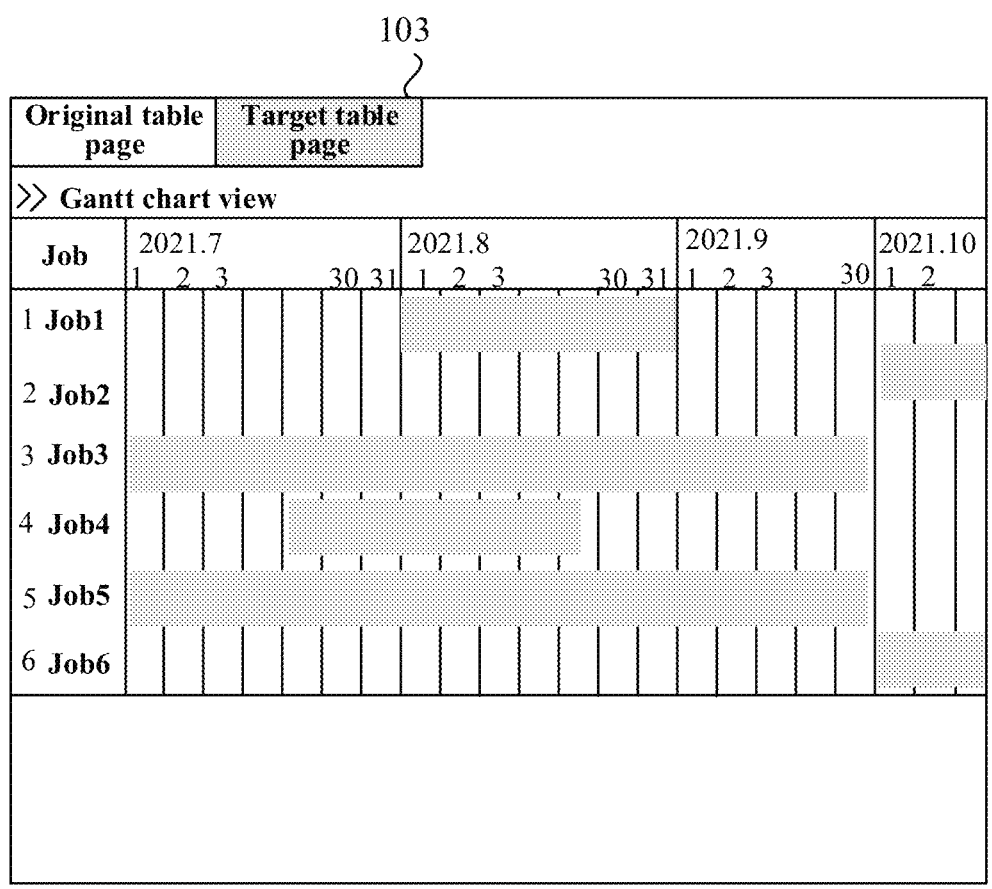
FIGS. 5A-5C illustrate a still further table data display interface provided by an embodiment of the present disclosure, respectively.

For example, as shown in FIG. 1A, on the original table page, the table data include the following classification identifications: job, department, category, number of recruits, city, and the like. If the table data selected by the user on the original table page are all row data under classification identifications including job, department, category, number of recruits, city, recruitment type, years of work, HR, job recruitment start time and job recruitment end time, and if the user-defined Gantt chart display mode includes displaying, in the Gantt chart view, table data corresponding to the job displayed in the Gantt chart views and event information of the job, displaying the selected table data on the target table page according to the Gantt chart view display mode is shown in FIG. 5A.

Alternatively, displaying the selected table data in the Gantt chart view on the target table page according to the Gantt chart view display mode, includes:

obtaining event information corresponding to different rows of the selected table data, and displaying, on the target table page, event information corresponding to a row of the selected table data according to a timeline corresponding to different rows.

When the selected original table page data include event information, in order to enable the user to more intuitively obtain an event stream corresponding to the event information, the Gantt chart view display mode includes obtaining event information corresponding to different rows of the selected table data, and displaying, on the target table page, event information corresponding to a row of the selected table data according to a timeline corresponding to different rows.

Specifically, continuing with FIG. 1A, on the original table page, the classification identifications of the table data 101 include: job, department, category, number of recruits, city, and the like. If the table data selected by the user on the original table page are all row data under classification identifications including job, department, category, number of recruits, city, recruitment type, years of work, HR, job recruitment start time and job recruitment end time, and if the user-defined Gantt chart display mode includes displaying, in the Gantt chart views, table data corresponding to the job and event information corresponding to the job, the table data of respective rows with the classification identification being job are obtained from the selected table data, event information of the selected table data corresponding to different rows is obtained, and then, event information corresponding to a row of the selected table data is displayed on the target table page according to a timeline corresponding to different rows. The specific display mode is shown in FIG. 5A.

The table data display method provided by the embodiments of the present disclosure includes, in response to the trigger operation on the third target conversion component, displaying, on the target table page, the selected table data in the Gantt chart views according to a Gantt chart view display mode, to thus implement display of the selected table data according to the Gantt chart view display mode.

Corresponding to Step S230, the method further includes:

in response to a trigger operation on a target Gantt chart view on the target table page, displaying the target Gantt chart view in a form of a card.

After the user triggers event information corresponding to a certain target Gantt chart view on the target table page, the target Gantt chart view is displayed in the form of a card where all identification information selected by the user on the original table page is displayed.

For example, event information of the table data corresponding to different rows in the embodiments of the present disclosure refers to a start time and an end time corresponding to the row data. In other implementations, event information may be in other manners, which is not specifically limited in embodiments of the present disclosure.

Figure 5B:
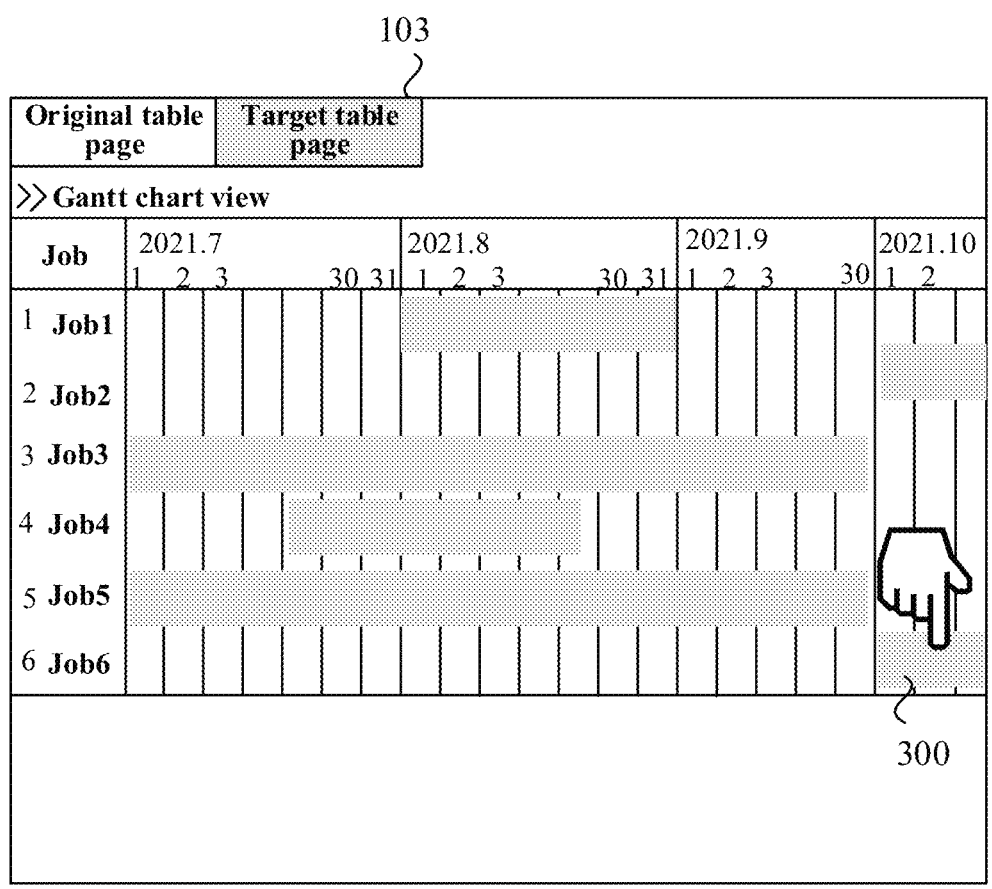

Specifically, the table data selected by the user on the original table page are all row data under classification identifications including: job, department, category, number of recruits, city, and the like, and the user-defined Gantt chart display mode includes displaying, in each Gantt chart, table data corresponding to the classification identification of position and time information corresponding to the position. At this time, displaying the selected table data in the Gantt chart views on the target table page according to the Gantt chart view display mode is shown in FIG. 5B. When the user triggers event information 400 in FIG. 5B, all selected column data in a certain row corresponding to the event information 400 are displayed in a form of a card. As shown in FIG. 4C, the selected table data displayed in the card are data corresponding to job, department, category, number of recruitments, city, recruitment type and years of work, with the job being job 6.

Alternatively, the method further includes:

in response to a trigger operation at a preset position on a card page, modifying and/or deleting a content of the preset position.

Figure 5C:
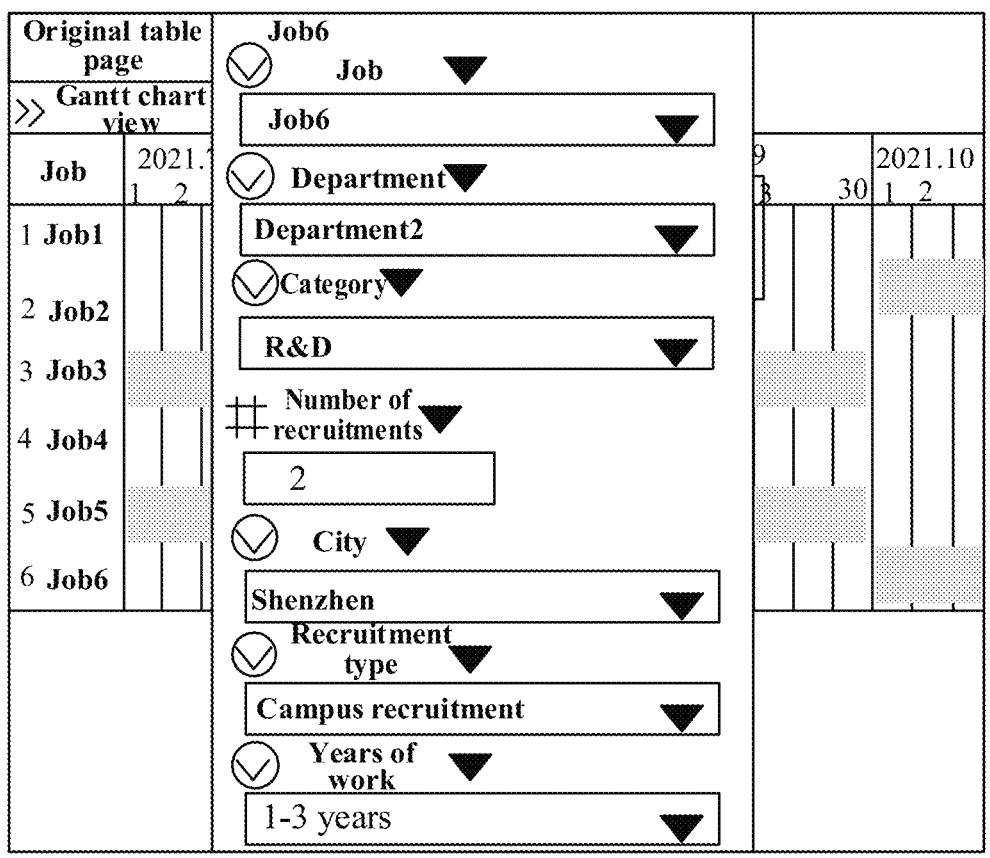

Referring to FIGS. 3C, 4C and 5C, when the user triggers the preset position of the card page, the user may modify the content at the triggered preset position.

Specifically, the preset position includes a first type area including identification information corresponding to each column in the table data, and a second type area including table data corresponding to each table in the table data.

For example, referring to FIG. 3C, the first type area includes: job, department, category, number of recruits, city, recruitment type, and years of work, and the second type area includes: job 2, department 1, product, 1, Shenzhen, social recruitment, and 5-8 year.

As an implementation, in response to a trigger operation on the first type area at the preset position of the card page, a content of the first type area is modified.

Figure 6A:
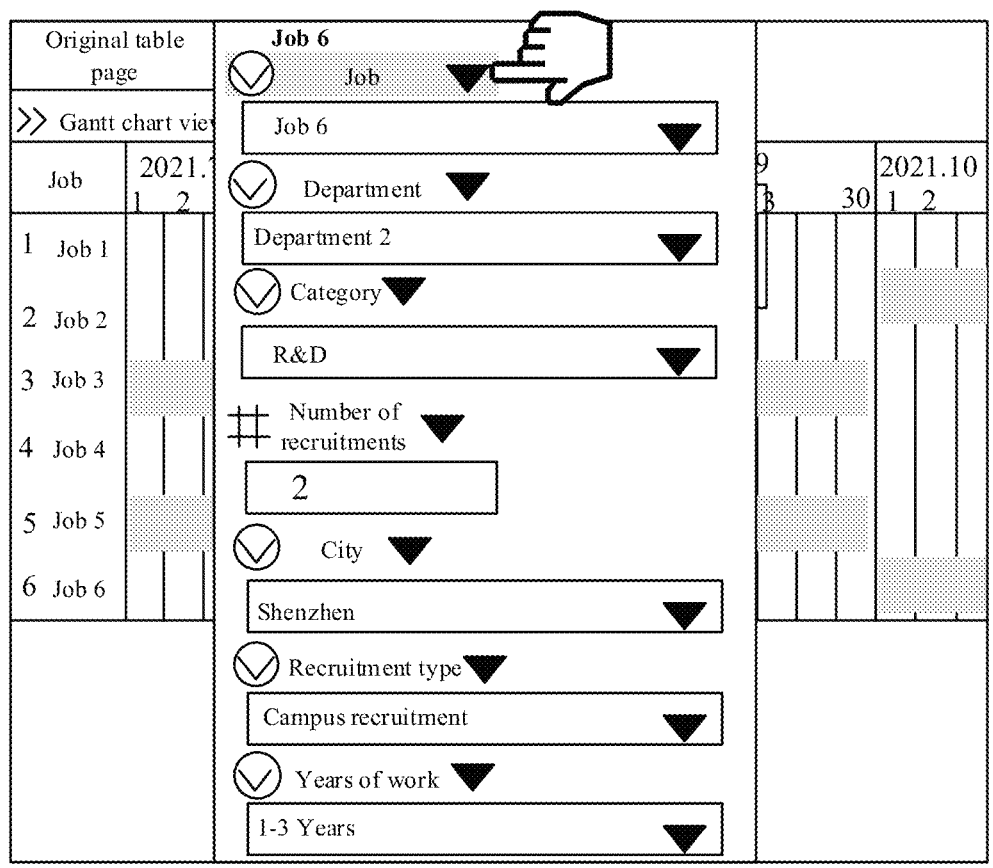
Figure 6B:
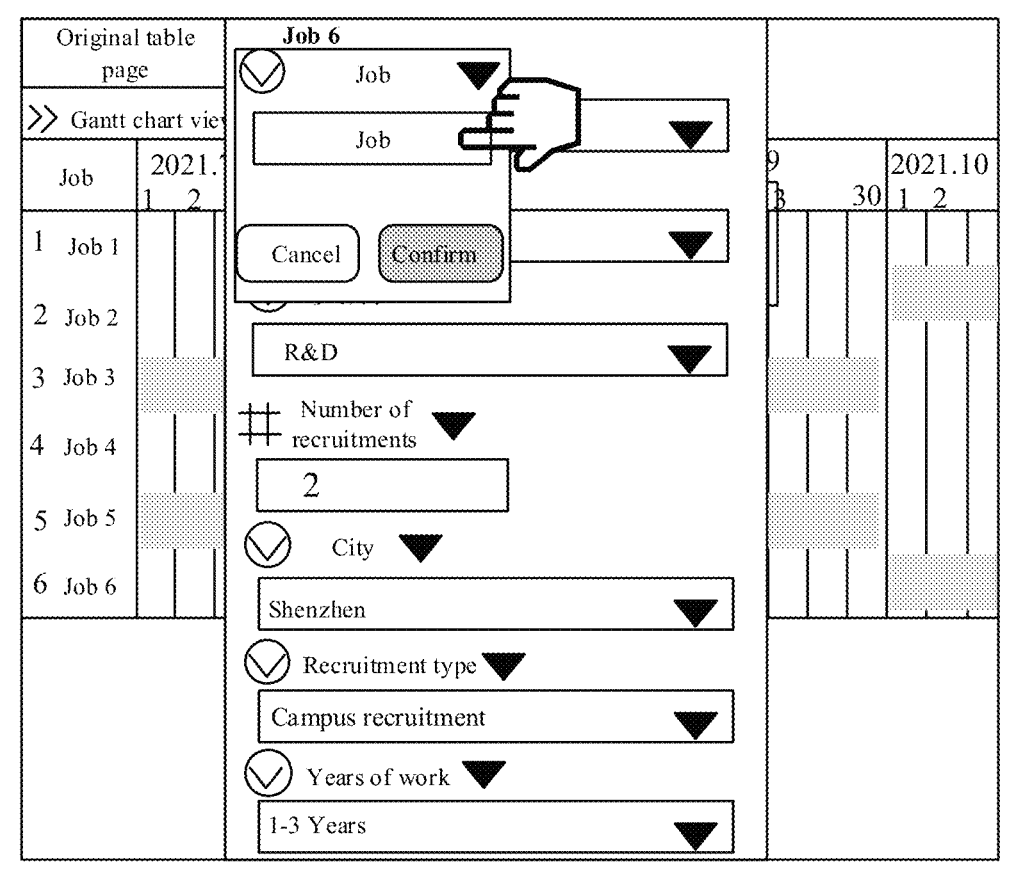
Figure 6C:
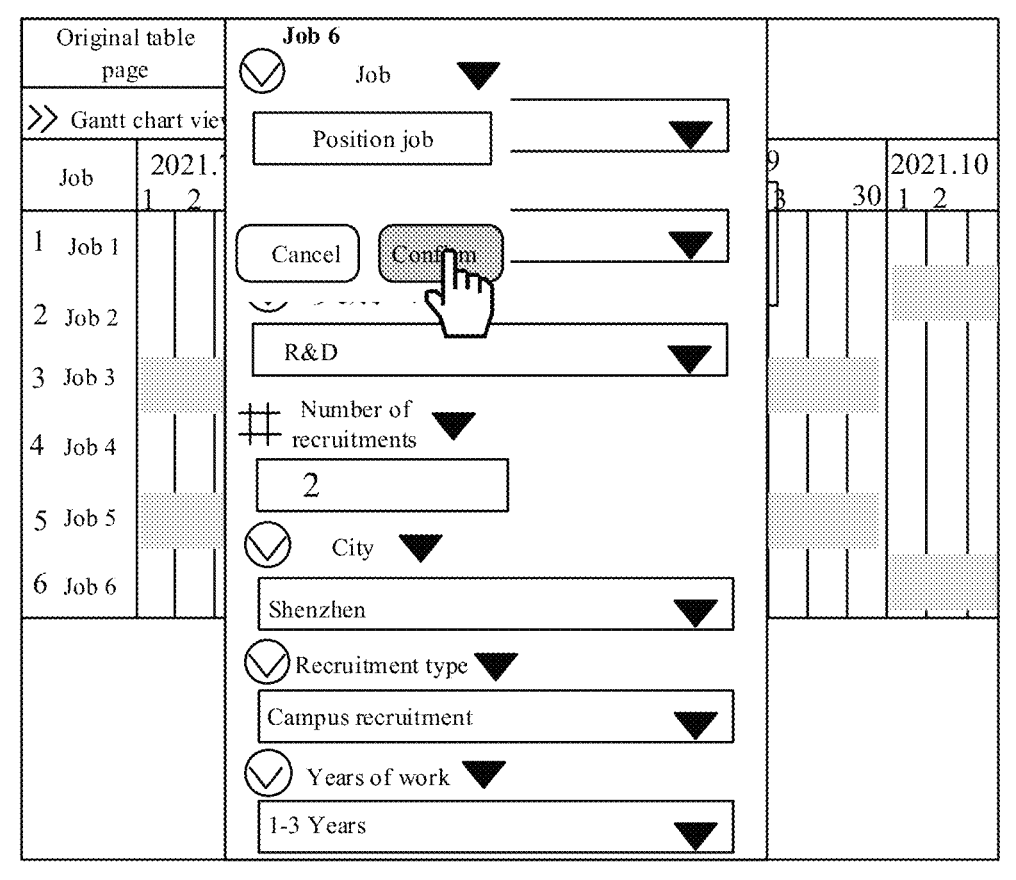

If the user triggers a target Gantt chart view on the target table page corresponding to the Gantt chart views, and if the target Gantt chart is displayed in a form of a card, the user can modify the first type area after triggering the first type area at the preset position of the card page. As shown in FIG. 6A, after the user triggers the first type area corresponding to the job on the card page, the user may modify the position identification information on the page as shown in FIG. 6B. For example, as shown in FIG. 6C, after the user modifies the job identification information to job work identification information and clicks "Confirm," the modification is saved. At this time, after the user triggers any one target Gantt chart view on the target table page, the identification information corresponding to the job is all modified to job work identification information.

It is worth noting that, in the above-mentioned embodiment, a target Gantt chart view is triggered on a target table page corresponding to the Gantt chart views, and a content of a first type area is modified on a card page corresponding to the target Gantt chart view; in other implementations, a target album view may be triggered on a target table page corresponding to the album views, and a content of a first type area is modified on a card page corresponding to the target album view. At this time, when the user triggers any one target album view on the target table page corresponding to the album views, the identification information corresponding to the job is modified to job work identification information. Alternatively, a target board view may be triggered on a target table page corresponding to board views, and a content of a first type area is modified on a card page corresponding to the target board view. At this time, when the user triggers any one target board view on the target table page corresponding to the board views, the identification information corresponding to the job is modified to the job work identification information.

As a further implementation, in response to a trigger operation on the second type area at a preset position of the card page, a content of the second type area is modified or deleted.

Figure 7A:
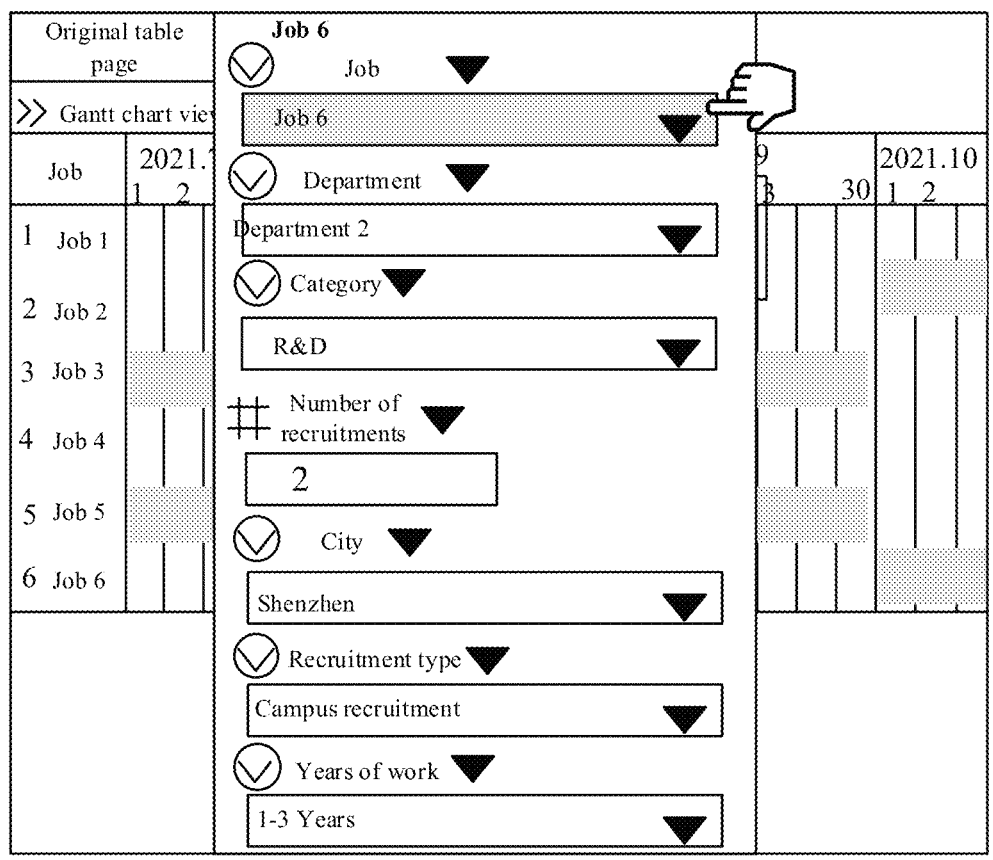
FIGS. 7A-7C illustrate a still further table data display interface provided by an embodiment of the present disclosure, respectively.

When the user triggers a target Gantt chart view on a target table page corresponding to the Gantt chart views and the target Gantt chart view is displayed in the form of a card, the user can delete or modify a content of the second type area after triggering the second type area at the preset position of the card page, as shown in FIG. 7A. After triggering the second type area corresponding to the job 6 of the card page, the user can modify job information on the page as shown in FIG. 7A. For example, as shown in FIG. 7B, if the user modifies the job information to job 1 information, clicks "Confirm," and then saves the modification, the job information in the target Gantt chart view is job 1 on the target table page corresponding to the Gantt chart view, as shown in FIG. 7C.

Figure 7B:
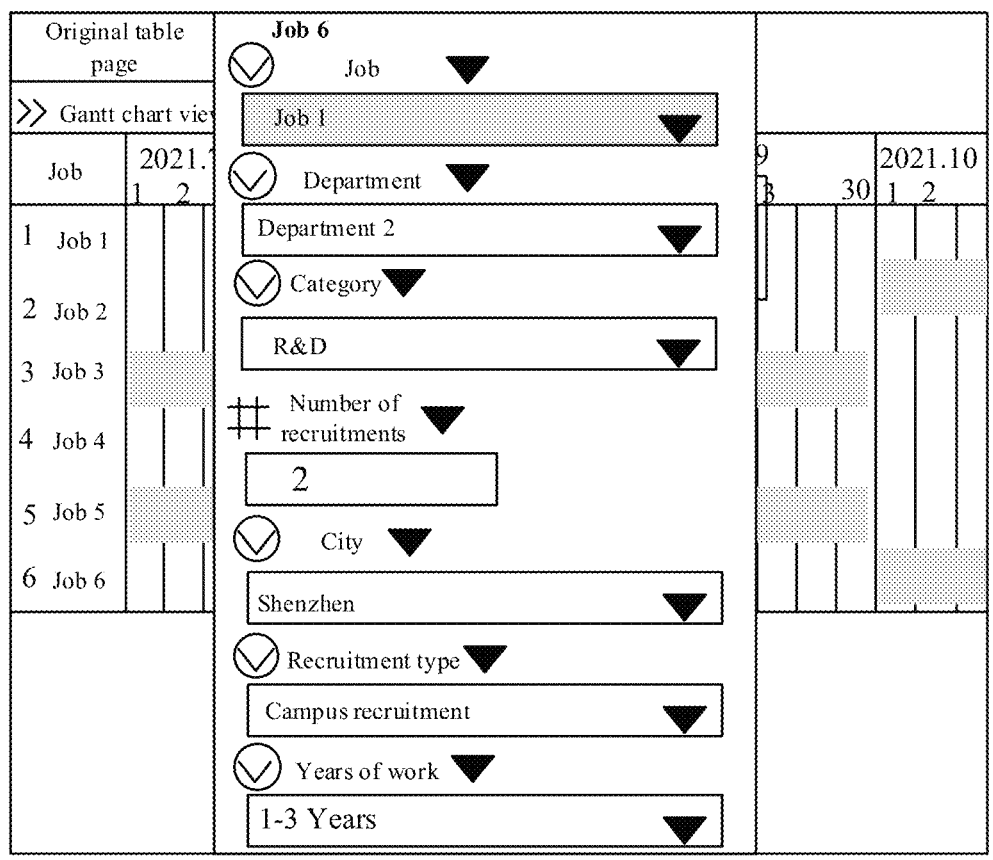
Figure 7C:
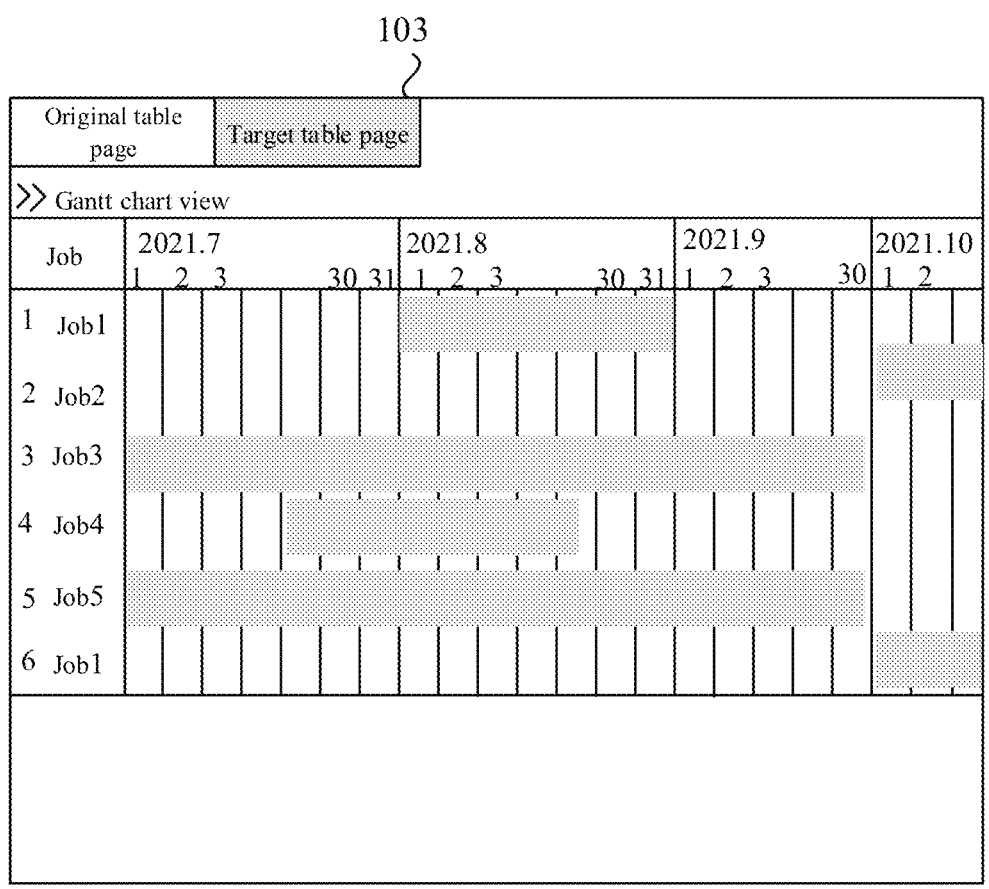

It is worth noting that FIGS. 7B and 7C exemplarily show modifying the content of the second type area, and the content of the second type area may be deleted in other implementations.

Alternatively, the method further includes, in response to a trigger operation on a configuration component on a target table page, a display mode of settings is modified on the target table page.

Figure 8A:
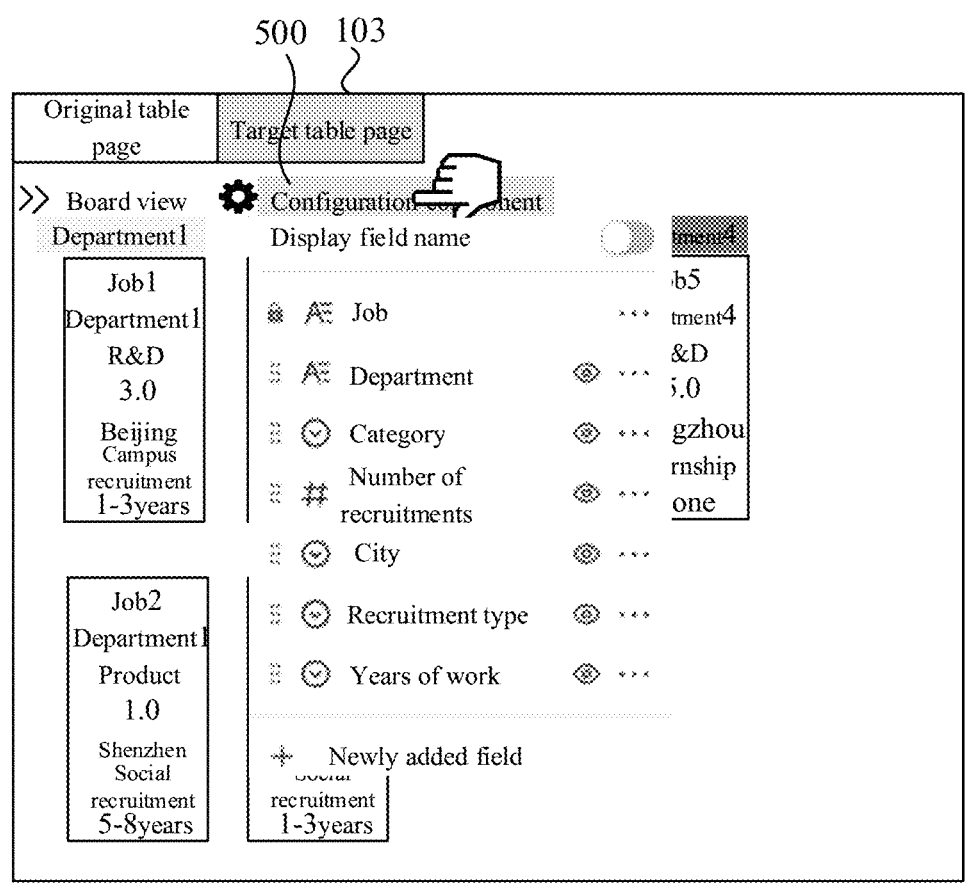
Figure 8B:
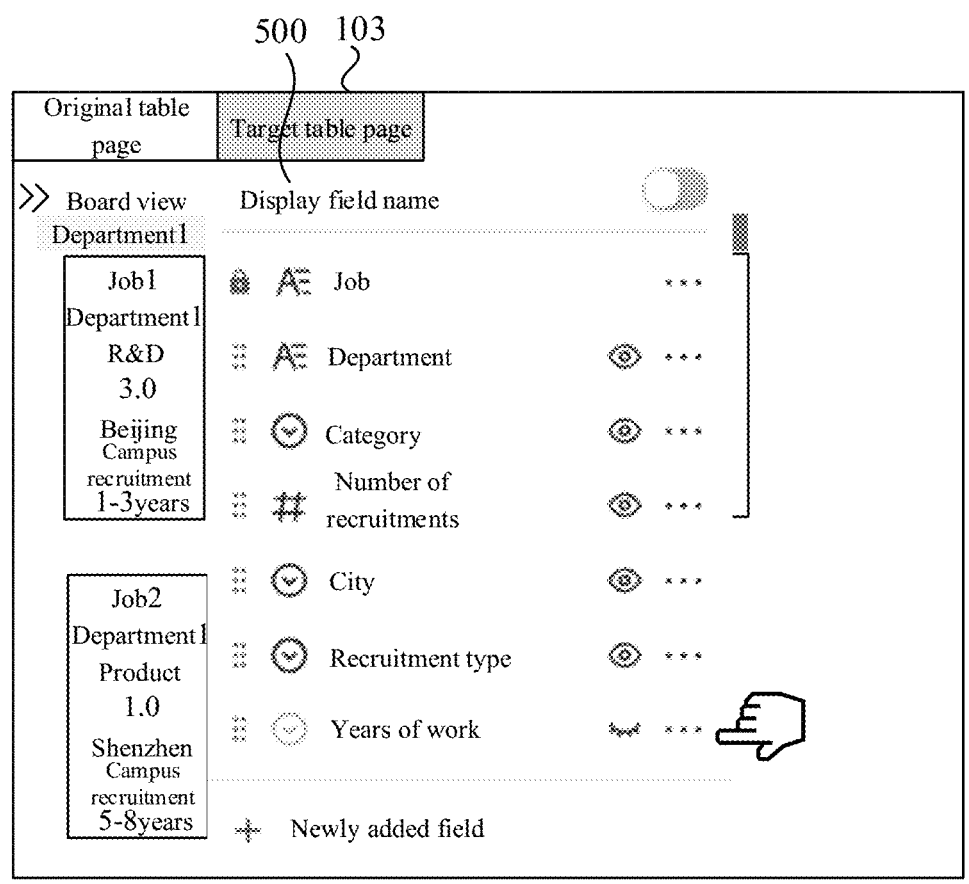

Specifically, as shown in FIG. 8A, after the user triggers the configuration component on the target table page, the user may select the display mode of the target table page. For example, if the user triggers the configuration component 500 and triggers the state corresponding to years of work to not be displayed, the user saves the setting interface and returns to the target table page, as shown in FIG. 8B, and information corresponding to years of work is not displayed on the target table page, as shown in FIG. 8C.

It is worth noting that, in the table data display method provided by the above embodiment, the specific conversion logic of data in the table is as follows: in the table title bar, in the case of a checkbox, it is converted into true/false; in the case of pictures, they are displayed as pic1 and pic2; in the case of an equation, it is displayed as a calculated value through the equation; if the text name is repeated, suffix numbers 1, 2 . . . are employed; in the case of containing more than 100 characters, it is truncated; in the presence of special characters, they are converted into spaces, and first and last spaces are removed.

The conversion logic of data in each table is as follows: if a dropdown list included in a table is a single selection, it is converted into characters corresponding to the single selection; if a table summary includes @person, it is converted into person fields, which are multiple selections by default; if numbers are included in a table, they are converted into number fields, and the maximum decimal places are reserved; if a table includes a date, it is converted into a date field, and a corresponding date format is reserved, which is YYYY/MM/DD by default; in the case of a checkbox, it is converted into a checkbox field; in the case of a picture, it is converted into an attachment filed; in the case of a text, if $2<=$a number of unique items in the column text$<=10$, the number of unique items$<=0.5$ and no link is provided, it is converted into a single-selection field, and if the above conditions are not met, it is converted into a text field.

In addition, if a selection column is not in a single format, a number of pictures, a number of drop-down types, a number of checkboxes, and a number of other types (text, date, number, and @person) are calculated and compared; if the number of picture types is the greatest, it is converted into a picture field; if the number of checkboxes is the greatest, it is converted into a checkbox field; if the number of drop-down types is the greatest and all of them are single selections, it is converted into a single selection, and as long as one drop-down multi-selection type is included, it is converted into multiple selections.

Further, if rows of selected table data exceed an upper limit of 10,000 rows, they are truncated at the $10,000^{th}$ row; if columns of the selected table data exceed an upper limit of 100 columns, they are truncated at the $100^{th}$ column; if a number of pictures is greater than 4,000, they are truncated at the $4,000^{th}$ picture; if a number of texts contained in a single cell is greater than 50,000, they are truncated at the $50,000^{th}$ text.

Figure 9:
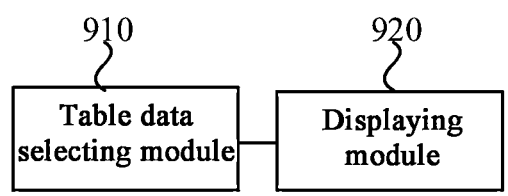
FIG. 9 illustrates a schematic diagram of a structure of a table data display apparatus provided by embodiments of the present disclosure.

FIG. 9 illustrates a schematic diagram of a structure of a table data display apparatus provided by an embodiment of the present disclosure. As shown therein, the table data display apparatus includes:

a table data selecting module 910 configured for in response to a selection operation on at least part of table data on an original table page, highlighting selected table data on the original table page; and a displaying module 920 configured for in response to a trigger operation on a target conversion component, displaying the selected table data on the target table page according to a target display mode, wherein the target display mode is related to the target conversion component.

According to the table data display method provided by the embodiments of the present disclosure, in response to a selection operation on at least part of table data on an original table page, the table data selection module highlights selected table data on the original table page, and in response to a trigger operation on a target conversion component, the display module displays the selected table data on the target table page according to a target display mode, where the target display mode is related to the target conversion component. In this way, the present disclosure can enable display of table data of a target area selected by a user on an original table page according to a target display mode. By displaying table data in a table in different modes, the present disclosure can diversify the display modes and meet different users' needs.

Alternatively, the apparatus further includes:
a board view displaying module configured for in response to a trigger operation on a first target conversion component, displaying selected table data in board views on a target table page; and/or
an album view displaying module configured for in response to a trigger operation on a second target conversion component, displaying selected table data in album views on a target table page; and/or
a Gantt chart view displaying module configured for in response to a trigger operation on a third target conversion component, displaying selected table data in Gantt chart views on a target table page.

Alternatively, the apparatus further includes:
a first board view display unit for, in response to a trigger operation on a first target component, displaying selected table data in board views on a target table page according to a board display mode.

Alternatively, the apparatus further includes:
A second board view display unit for based on identification information of different row data, in the selected table data, corresponding to the target column, displaying the selected table data in the board views after classifying the selected table data according to the identification information.

Alternatively, the apparatus further includes:
a first album view display unit for, in response to a trigger operation on a second target component, displaying selected table data in album views on a target table page according to an album display mode.

Alternatively, the apparatus further includes:
a second album display unit for obtaining target table data corresponding to the preset number of target columns corresponding to different rows of the selected table data, and displaying, on the target table page, the selected target table data in album views corresponding to different rows.

Alternatively, the apparatus further includes:
a first Gantt chart view display unit for, in response to a trigger operation on a third target component, displaying selected table data in Gantt chart views on a target table page according to a Gantt chart display mode.

Alternatively, the apparatus further includes:
a second Gantt chart view display unit for obtaining event information corresponding to different row of the selected table data, and displaying, on the target table page, event information corresponding to a row of the selected table data according to a timeline corresponding to different rows.

Alternatively, the apparatus further includes:
a first card displaying module configured for in response to a trigger operation on a target board view on a target table page, the target board view in a form of cards; or
a second card displaying module configured for in response to a trigger operation on a target album view on a target table page, the target album view in a form of cards; or
a third card displaying module configured for in response to a trigger operation on event information corresponding to a target Gantt chart view on a target table page, the target Gantt chart in a form of a card.

Alternatively, the apparatus further includes:
an operating module configured for in response to a trigger operation on a preset position of a card page, modifying and/or deleting a content at the preset position.

Alternatively, the apparatus further includes:
a first operation unit configured for in response to a trigger operation on a first type area at the preset position of the card page, modifying a content of the first type area.

Alternatively, the apparatus further includes:
a second operation unit configured for in response to a trigger operation on a second type area at the preset position of the card page, modifying or deleting a content of the second type area.

Alternatively, the apparatus further includes:
a configuration modifying module configured for in response to a trigger operation on a configuration component, modifying a display mode on a target table page.

The apparatus provided by embodiments of the present disclosure can execute the method provided by any one of the embodiments of the present disclosure, and includes functional modules and has advantages corresponding to the method.

Figure 10:
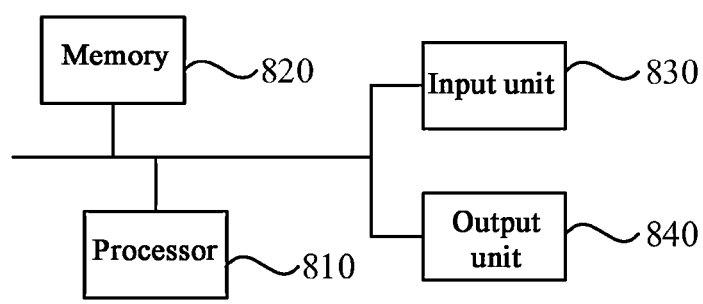
FIG. 10 illustrates a schematic diagram of a structure of an electronic device provided by embodiments of the present disclosure.

FIG. 10 illustrates a schematic diagram of an electronic device provided by embodiments of the present disclosure. As shown therein, the electronic device includes a processor 810, a memory 820, input unit 820 and output unit 840. There may be one or more processors 810, where one processor 810 is shown in FIG. 10 as an example. The processor 810, the memory 320, the input unit 830 and the output unit 840 can be connected via a bus or in other manners, where a bus connection is shown in FIG. 10 as an example.

The memory 820 may include mainly a program storage zone for storing an operation system and an application program required by at least one function, and a data storage zone for storing data created based on use of terminals, and the like. In addition, the memory 820 may include a high-speed random access memory, and may further include a non-volatile memory such as at least one disk storage device, flash device, or other volatile solid-state storage device. In some embodiments, the memory 820 may further include memories arranged remotely relative to the processor 810, which can be connected to the computing device via a network. Examples of the network include, but are not limited to, an internet, intranet, local area network, mobile communication network, and a combination thereof.

The input unit 830 can be used to receive number or character information input therein, and generate a signal input related to user settings and functional control of the electronic device. The input unit 830 may include a keyboard, mouse, and the like. The output unit 840 may include a display device such as a display screen, and the like.

Embodiments of the present disclosure further provide a storage medium having computer executable instructions, where the computer executable instructions are used to implement the method provided by the embodiments of the present disclosure when executed by a computer processor.

According to the storage medium having computer executable instructions, the computer executable instructions are not limited to the method operations as mentioned above, but may further implement related operations in the method provided by any one embodiments of the present disclosure.

The present disclosure further provides a computer program product which causes a computer to execute the method of the application program according to the above embodiments when running on the computer.

It is worth noting that, the relationship terms, such as "first," "second," and the like, are only used to differentiate an entity or operation from a further entity or operation, without necessarily requiring or indicating that those entitles or operations have any actual relationship or be placed in any sequence. The term "include," "comprise," or any other variant, is to be read as non-exclusive inclusion, i.e., a process, method, article, or device including a series of elements not only covers elements listed thereafter but also comprises other elements not listed explicitly, or may include all elements inherent to the process, method, article or device. Without further limitation, an element defined by "includes a . . . " does not exclude the presence of a further identical element in the process, method, article, or device including the element.

The description above only relates to specific implementations of the present disclosure to help those skilled in the art understand or implement the present disclosure. Multiple modifications to those embodiments are obvious to those skilled in the art, and the general principles defined here can be implemented in other embodiments in the premise of not departing from the spirits or scope of the present disclosure. Therefore, the present disclosure claims the broadest scope conforming to the principles and novel features disclosed here, rather than being limited to those embodiments described above.

We claim:

1. A method of table data displaying, comprising:
   in response to a selection operation on at least part of table data on an original table page, highlighting selected table data on the original table page; and
   in response to a trigger operation on a target conversion component, displaying the selected table data in a target display mode on a target table page, wherein the target display mode is related to the target conversion component, wherein the target display mode comprises displaying table data in different rows in the selected table data in the target table page corresponding to the target conversion component;
   wherein the target conversion component at least comprises at least one of a first target conversion component, a second target conversion component, or a third target conversion component;
   wherein in response to the trigger operation on the target conversion component, displaying the selected table data in the target display mode on the target table page comprises:
   in response to the trigger operation on the third target conversion component, displaying, on the target table page, the selected table data in Gantt chart views according to a Gantt chart view display mode, wherein the Gantt chart view display mode comprises: displaying event information corresponding to different rows of table data according to a timeline;
   wherein displaying, on the target table page, the selected table data in the Gantt chart views according to the Gantt chart view display mode comprises:
      obtaining event information corresponding to different row of the selected table data, and displaying, on the target table page, event information corresponding to a row of the selected table data according to a timeline corresponding to different rows.

2. The method of claim 1, wherein in response to a trigger operation on the first target conversion component, displaying the selected table data in board views on the target table page which comprises:
   in response to the trigger operation on the first target conversion component, displaying the selected table data in the board views on the target table page according to a board display mode.

3. The method of claim 2, wherein the board display mode comprises: classifying the table data according to identification information corresponding to a target column;
   wherein displaying the selected table data in board views on the target table page according to a board display mode comprises:
   based on identification information of different row data, in the selected table data, corresponding to the target column, displaying the selected table data in the board views after classifying the selected table data according to the identification information.

4. The method of claim 1, wherein in response to a trigger operation on the second target conversion component, displaying the selected table data in album views on the target table page which comprises:
   in response to the trigger operation on the second target conversion component, displaying the selected table data in the album views on the target table page according to an album display mode.

5. The method of claim 4, wherein the album display mode comprises: displaying identification information corresponding to a preset number of target columns in the table data;
   wherein displaying the selected table data in the album views on the target table page according to the album display mode comprises:
   obtaining target table data corresponding to the preset number of target columns corresponding to different rows of the selected table data, and displaying, on the target table page, the selected target table data in album views corresponding to different rows.

6. The method of claim 1, further comprising:
   in response to a trigger operation on a target board view on the target table page, displaying the target board view in a form of cards;
   in response to a trigger operation on a target album view on the target table page, displaying the target album view in a form of cards; or in response to a trigger operation on a target Gantt chart view on the target table page, displaying the target Gantt chart view in a form of cards.

7. The method of claim 6, further comprising:
in response to a trigger operation on a preset position of a card page, performing at least one of: modifying or deleting a content of the preset position.

8. The method of claim 7, wherein in response to the trigger operation on the preset position of the card page, performing at least one of: modifying or deleting the content of the preset position comprises:
in response to a trigger operation on a first type area at the preset position of the card page, modifying a content of the first type area.

9. The method of claim 7, wherein in response to the trigger operation on the preset position of the card page, performing at least one of: modifying or deleting the content of the preset position comprises:
in response to a trigger operation on a second type area at the preset position of the card page, modifying and deleting a content of the second type area.

10. The method of claim 1, further comprising:
in response to a trigger operation on a configuration component, modifying a display mode on the target table page.

11. The method of claim 1, wherein the displaying the selected table data in the target display mode on the target table page further comprises at least one of:
in response to a trigger operation on the first target conversion component, displaying the selected table data in board views on the target table page; or
in response to a trigger operation on the second target conversion component, displaying the selected table data in album views on the target table page.

12. An electronic device, comprising:
one or more processors; and
a storage device for storing one or more programs,
wherein the one or more programs, when executed by the one or more processors, cause the one or more processors to implement the method comprising:
in response to a selection operation on at least part of table data on an original table page, highlighting selected table data on the original table page; and
in response to a trigger operation on a target conversion component, displaying the selected table data in a target display mode on a target table page, wherein the target display mode is related to the target conversion component, wherein the target display mode comprises displaying table data in different rows in the selected table data in the target table page corresponding to the target conversion component;
wherein the target conversion component at least comprises at least one of a first target conversion component, a second target conversion component, or a third target conversion component;
wherein in response to the trigger operation on the target conversion component, displaying the selected table data in the target display mode on the target table page comprises:
in response to the trigger operation on the third target conversion component, displaying, on the target table page, the selected table data in Gantt chart views according to a Gantt chart view display mode, wherein the Gantt chart view display mode comprises: displaying event information corresponding to different rows of table data according to a timeline;
wherein displaying, on the target table page, the selected table data in the Gantt chart views according to the Gantt chart view display mode comprises:
obtaining event information corresponding to different row of the selected table data, and displaying, on the target table page, event information corresponding to a row of the selected table data according to a timeline corresponding to different rows.

13. The electronic device of claim 12, wherein in response to a trigger operation on the first target conversion component, displaying the selected table data in board views on the target table page which comprises:
in response to the trigger operation on the first target conversion component, displaying the selected table data in the board views on the target table page according to a board display mode.

14. The electronic device of claim 12, wherein the displaying the selected table data in the target display mode on the target table page further comprises at least one of:
in response to a trigger operation on the first target conversion component, displaying the selected table data in board views on the target table page; or
in response to a trigger operation on the second target conversion component, displaying the selected table data in album views on the target table page.

15. A non-transitory computer readable storage medium having computer programs stored thereon, wherein the programs, when executed by a processor, implement the method comprising:
in response to a selection operation on at least part of table data on an original table page, highlighting selected table data on the original table page; and
in response to a trigger operation on a target conversion component, displaying the selected table data in a target display mode on a target table page, wherein the target display mode is related to the target conversion component, wherein the target display mode comprises displaying table data in different rows in the selected table data in the target table page corresponding to the target conversion component;
wherein the target conversion component at least comprises at least one of a first target conversion component, a second target conversion component, or a third target conversion component;
wherein in response to the trigger operation on the target conversion component, displaying the selected table data in the target display mode on the target table page comprises:
in response to the trigger operation on the third target conversion component, displaying, on the target table page, the selected table data in Gantt chart views according to a Gantt chart view display mode, wherein the Gantt chart view display mode comprises: displaying event information corresponding to different rows of table data according to a timeline;
wherein displaying, on the target table page, the selected table data in the Gantt chart views according to the Gantt chart view display mode comprises:
obtaining event information corresponding to different row of the selected table data, and displaying, on the target table page, event information corresponding to a row of the selected table data according to a timeline corresponding to different rows.

16. The non-transitory computer readable storage medium of claim 15, wherein in response to a trigger operation on the first target conversion component, displaying the selected table data in board views on the target table page which comprises:

in response to the trigger operation on the first target conversion component, displaying the selected table data in the board views on the target table page according to a board display mode.

17. The non-transitory computer readable storage medium of claim 16, wherein the board display mode comprises: classifying the table data according to identification information corresponding to a target column;

wherein displaying the selected table data in board views on the target table page according to a board display mode comprises:

based on identification information of different row data, in the selected table data, corresponding to the target column, displaying the selected table data in the board views after classifying the selected table data according to the identification information.

18. The non-transitory computer readable storage medium of claim 15, wherein in response to a trigger operation on the second target conversion component, displaying the selected table data in album views on the target table page which comprises:

in response to the trigger operation on the second target conversion component, displaying the selected table data in the album views on the target table page according to an album display mode.

19. The non-transitory computer readable storage medium of claim 18, wherein the album display mode comprises: displaying identification information corresponding to a preset number of target columns in the table data;

wherein displaying the selected table data in the album views on the target table page according to the album display mode comprises:

obtaining target table data corresponding to the preset number of target columns corresponding to different rows of the selected table data, and displaying, on the target table page, the selected target table data in album views corresponding to different rows.

20. The non-transitory computer readable storage medium of claim 15, wherein the method further comprises:

in response to a trigger operation on a target board view on the target table page, displaying the target board view in a form of cards;

in response to a trigger operation on a target album view on the target table page, displaying the target album view in a form of cards; or in response to a trigger operation on a target Gantt chart view on the target table page, displaying the target Gantt chart view in a form of cards.

21. The non-transitory computer readable storage medium of claim 20, wherein the method further comprises:

in response to a trigger operation on a preset position of a card page, performing at least one of: modifying or deleting a content of the preset position.

22. The non-transitory computer readable storage medium of claim 21, wherein in response to the trigger operation on the preset position of the card page, performing at least one of: modifying or deleting the content of the preset position comprises:

in response to a trigger operation on a first type area at the preset position of the card page, modifying a content of the first type area.

23. The non-transitory computer readable storage medium of claim 15, wherein the displaying the selected table data in the target display mode on the target table page further comprises at least one of:

in response to a trigger operation on the first target conversion component, displaying the selected table data in board views on the target table page; or in response to a trigger operation on the second target conversion component, displaying the selected table data in album views on the target table page.

\* \* \* \* \*